(12) United States Patent
Kobayashi et al.

(10) Patent No.: US 11,269,245 B2
(45) Date of Patent: Mar. 8, 2022

(54) LIGHT SOURCE UNIT AND PROJECTION DISPLAY INCLUDING A PHOSPHOR WHEEL

(71) Applicant: SONY CORPORATION, Tokyo (JP)

(72) Inventors: Izushi Kobayashi, Tokyo (JP); Mariko Obinata, Kanagawa (JP); Yuki Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/637,865

(22) PCT Filed: Jul. 18, 2018

(86) PCT No.: PCT/JP2018/026861
§ 371 (c)(1),
(2) Date: Feb. 10, 2020

(87) PCT Pub. No.: WO2019/035307
PCT Pub. Date: Feb. 21, 2019

(65) Prior Publication Data
US 2020/0249554 A1 Aug. 6, 2020

(30) Foreign Application Priority Data
Aug. 17, 2017 (JP) .............................. JP2017-157570

(51) Int. Cl.
*G03B 21/20* (2006.01)
*F21V 7/26* (2018.01)
(52) U.S. Cl.
CPC .............. *G03B 21/204* (2013.01); *F21V 7/26* (2018.02)

(58) Field of Classification Search
CPC ................................ G03B 21/204; F21V 7/26
See application file for complete search history.

(56) References Cited

U.S. PATENT DOCUMENTS 8,556,437 B2 * 10/2013 Miyake .................... F21V 7/30
362/84
9,081,268 B2 * 7/2015 Sugiyama ............ G03B 21/204
(Continued)

FOREIGN PATENT DOCUMENTS

JP 2012-114040 6/2012
JP 2013-033833 2/2013
(Continued)

OTHER PUBLICATIONS

Extended European Search Report for European Patent Application No. 18845772.5, dated Jul. 10, 2020, 7 pages.
(Continued)

*Primary Examiner* — Bao-Luan Q Le
(74) *Attorney, Agent, or Firm* — Sheridan Ross P.C.

(57) ABSTRACT

A light source unit according to an embodiment of the present disclosure includes: a light source section; and a wavelength conversion element that is excited by exciting light from the light source section to emit fluorescent light. The wavelength conversion element includes a substrate that is rotatable around a rotation axis, a phosphor layer including a plurality of phosphor particles, and a quantum-dot layer including a plurality of quantum dots. The phosphor layer and the quantum-dot layer are disposed in this order relative to the light source section.

20 Claims, 15 Drawing Sheets

(56) References Cited

U.S. PATENT DOCUMENTS

| | | | | |
|---|---|---|---|---|
| 9,429,830 B2* | 8/2016 | Nojima | | G03B 21/204 |
| 9,581,879 B2* | 2/2017 | Hsieh | | F21V 13/08 |
| 9,609,293 B2* | 3/2017 | Saka | | H04N 9/3114 |
| 9,678,418 B2* | 6/2017 | Jeoung | | G03B 21/16 |
| 9,726,335 B2* | 8/2017 | Chang | | H04N 9/3114 |
| 9,891,511 B2* | 2/2018 | Chang | | C09K 11/08 |
| 10,101,645 B2* | 10/2018 | Hashizume | | G03B 21/2013 |
| 10,234,753 B2* | 3/2019 | Chou | | F21V 9/30 |
| 10,281,810 B2* | 5/2019 | Wang | | H04N 9/3164 |
| 10,317,785 B2* | 6/2019 | Chou | | H01L 33/56 |
| 10,345,688 B2* | 7/2019 | Chou | | G02B 26/008 |
| 10,481,474 B2* | 11/2019 | Liao | | G03B 33/08 |
| 10,663,845 B2* | 5/2020 | Deng | | H04N 9/3144 |
| 2009/0039375 A1* | 2/2009 | LeToquin | | H01L 33/504 |
| | | | | 257/98 |
| 2011/0149549 A1* | 6/2011 | Miyake | | F21V 9/32 |
| | | | | 362/84 |
| 2012/0300178 A1* | 11/2012 | Sugiyama | | H04N 9/3164 |
| | | | | 353/31 |
| 2013/0113011 A1* | 5/2013 | Dutta | | H01L 33/58 |
| | | | | 257/98 |
| 2013/0126930 A1* | 5/2013 | Kabuki | | G02B 27/142 |
| | | | | 257/98 |
| 2015/0098070 A1* | 4/2015 | Hsieh | | F21V 9/38 |
| | | | | 355/67 |
| 2015/0205189 A1* | 7/2015 | Nojima | | H01L 33/501 |
| | | | | 353/31 |
| 2015/0308637 A1* | 10/2015 | Chang | | C09K 11/08 |
| | | | | 362/84 |
| 2015/0316839 A1* | 11/2015 | Jeoung | | G02B 27/283 |
| | | | | 353/20 |
| 2016/0087164 A1 | 3/2016 | Kawano et al. | | |
| 2016/0091782 A1 | 3/2016 | Hashizume | | |
| 2016/0109627 A1* | 4/2016 | Yamanaka | | F21S 41/176 |
| | | | | 362/84 |
| 2016/0116122 A1* | 4/2016 | Chang | | H04N 9/3158 |
| | | | | 362/84 |
| 2016/0147136 A1* | 5/2016 | Nojima | | G03B 21/204 |
| | | | | 353/98 |
| 2016/0150200 A1* | 5/2016 | Saka | | G03B 21/204 |
| | | | | 353/31 |
| 2016/0377968 A1* | 12/2016 | Yasumatsu | | G03B 21/204 |
| | | | | 353/31 |
| 2017/0277029 A1* | 9/2017 | Chang | | B32B 17/00 |
| 2017/0307968 A1* | 10/2017 | Nagasaki | | F21S 41/176 |
| 2017/0352789 A1* | 12/2017 | Miyanaga | | H01L 33/508 |
| 2018/0052386 A1* | 2/2018 | Hashizume | | G03B 21/204 |
| 2018/0194996 A1* | 7/2018 | Frischeisen | | C09K 11/663 |
| 2018/0299755 A1* | 10/2018 | Chou | | F21V 14/08 |
| 2018/0364553 A1* | 12/2018 | Chou | | H01L 33/502 |
| 2019/0011819 A1* | 1/2019 | Chou | | F21V 14/08 |
| 2019/0155134 A1* | 5/2019 | Komatsu | | G03B 33/12 |
| 2019/0163041 A1* | 5/2019 | Deng | | G03B 21/16 |
| 2020/0006603 A1* | 1/2020 | Miyanaga | | H01L 33/504 |
| 2020/0006604 A1* | 1/2020 | Miyanaga | | H01L 33/502 |
| 2020/0326615 A1* | 10/2020 | Hsu | | G03B 21/2066 |

FOREIGN PATENT DOCUMENTS

| | | |
|---|---|---|
| JP | 2016-066664 | 4/2016 |
| JP | 2016-071128 | 5/2016 |
| TW | 201403878 | 1/2014 |

OTHER PUBLICATIONS

International Search Report prepared by the Japan Patent Office dated Sep. 5, 2018, for International Application No. PCT/JP2018/026861.

* cited by examiner

LIGHT SOURCE UNIT AND PROJECTION DISPLAY INCLUDING A PHOSPHOR WHEEL

CROSS REFERENCE TO RELATED APPLICATIONS

This application is a national stage application under 35 U.S.C. 371 and claims the benefit of PCT Application No. PCT/JP2018/026861 having an international filing date of 18 Jul. 2018, which designated the United States, which PCT application claimed the benefit of Japanese Patent Application No. 2017-157570 filed 17 Aug. 2017, the entire disclosures of each of which are incorporated herein by reference.

TECHNICAL FIELD

The present disclosure relates to a light source unit having a phosphor wheel, and a projection display that includes such a light source unit.

BACKGROUND ART

In recent years, in a solid-state light source for a projector, a method has been prevailing that derives red light and green light by exciting a Ce-YAG (Cerium: Yttrium Aluminum Garnet) phosphor, and then cutting unnecessary wavelengths from fluorescence with use of a filter. However, a color gamut in such a method is as narrow as about 60% in the BT202 specifications. Further, in a case where display is performed using D65 that is defined as a white point in the sRGB specifications, a red light component of fluorescent light becomes a rate-limiting factor. This has caused an issue of wasting a green light component of the fluorescence by about 30%, resulting in deterioration in light source efficiency.

In contrast, for example, PTL 1 discloses a light source unit that extends an emission wavelength band. In such a light source unit, it is proposed to achieve a light source having a wide color gamut and high brightness by causing exciting light to enter the light source from a Ce-YAG phosphor side and disposing a red phosphor on the backside thereof, thereby suppressing luminance saturation of the red phosphor.

CITATION LIST

Patent Literature

PTL 1: Japanese Unexamined Patent Application Publication No. 2012-114040

SUMMARY OF THE INVENTION

Incidentally, in a light source for a projector, it is desired to achieve both a wider color gamut and higher luminance.

It is desirable to provide a light source unit and a projection display that make it possible to achieve both a wider color gamut and higher luminance.

A light source unit according to an embodiment of the present disclosure includes: a light source section; and a wavelength conversion element that is excited by exciting light from the light source section to emit fluorescent light. The wavelength conversion element includes a substrate that is rotatable around a rotation axis, a phosphor layer including a plurality of phosphor particles, and a quantum-dot layer including a plurality of quantum dots. The phosphor layer and the quantum-dot layer are disposed in this order relative to the light source section.

A projection display according to an embodiment of the present disclosure includes: a light source unit; a light modulation element that modulates light outputted from the light source unit; and a projection optical system that projects light from the light modulation element. The light source unit mounted on the projection display includes the same components as those of the above-described light source unit according to the embodiment of the present disclosure.

In the light source unit according to the embodiment of the present disclosure, and the projection display according to the embodiment of the present disclosure, as the wavelength conversion element, the phosphor layer including the plurality of phosphor particles and the quantum-dot layer including the plurality of quantum dots are disposed in this order relative to the light source section on the substrate that is rotatable around the rotation axis. This causes the exciting light to first enter the phosphor layer. Accordingly, the quantum-dot layer is excited mainly by fluorescence, resulting in reduction in Stokes loss, and suppression of an increase in temperature of the quantum-dot layer. This makes it possible to reduce a change in an emission output and a change in an emission wavelength.

According to the light source unit of the embodiment of the present disclosure, and the projection display of the embodiment of the present disclosure, the phosphor layer and the quantum-dot layer are disposed in this order relative to the light source section; therefore, exciting light outputted from the light source section first enters the phosphor layer, resulting in reduction in Stokes loss, suppression of an increase in temperature of the quantum-dot layer, and reduction in changes in an emission output and an emission wavelength of the quantum dots. This makes it possible to achieve higher luminance and a wide color gamut of light outputted from the wavelength conversion element.

It is to be noted that effects described above are not necessarily limitative, and any of effects described in the present disclosure may be provided.

MODES FOR CARRYING OUT THE INVENTION

Hereinafter, some embodiments of the present disclosure are described in detail with reference to the drawings. The following description is given of specific examples of the present disclosure, and the present disclosure is not limited to the following embodiments. In addition, the present disclosure is not limited to positions, dimensions, dimension ratios, etc. of respective components illustrated in the respective drawings. It is to be noted that description is given in the following order.

1. First Embodiment (a light source unit that includes a phosphor wheel having a phosphor layer and a quantum-dot layer on a substrate)
    1-1. Configuration of Phosphor Wheel
    1-2. Configuration of Light Source Unit
    1-3. Configuration of Projector
    1-4. Workings and Effects
2. Modification Examples
    2-1. Modification Example 1 (an example where a quantum-dot layer is sandwiched between a substrate and a phosphor layer, and a binder layer is provided around the quantum-dot layer)
    2-2. Modification Example 2 (an example where a quantum-dot layer is sealed inside a binder layer)
    2-3. Modification Example 3 (an example where a spacer is provided around a quantum-dot layer)
    2-4. Modification Example 4 (an example where a spacer is provided around a quantum-dot layer, and the quantum-dot layer is sealed by a binder layer)
    2-5. Modification Example 5 (an example where a quantum-dot layer is formed in a space that includes a substrate, a phosphor layer, and a gas barrier material)
    2-6. Modification Example 6 (an example where a quantum-dot layer is configured in a microreflector structure)
    2-7. Modification Example 7 (an example where a particulate phosphor layer is provided between a quantum-dot layer and a counter substrate)
    2-8. Modification Example 8 (an example where a particulate phosphor layer is fixed on a quantum-dot layer)
3. Second Embodiment (an example of a transmissive phosphor wheel)
4. Modification Examples
    4-1. Modification Example 9 (an example of a time-division phosphor wheel)
    4-2. Modification Example 10 (an example of a fixed wavelength conversion element)
    4-3. Modification Example 11 (an example of a light source unit having a fixed wavelength conversion element)
    4-4. Modification Example 12 (an example of another configuration of a light source unit)

1. First Embodiment

Figure 1:
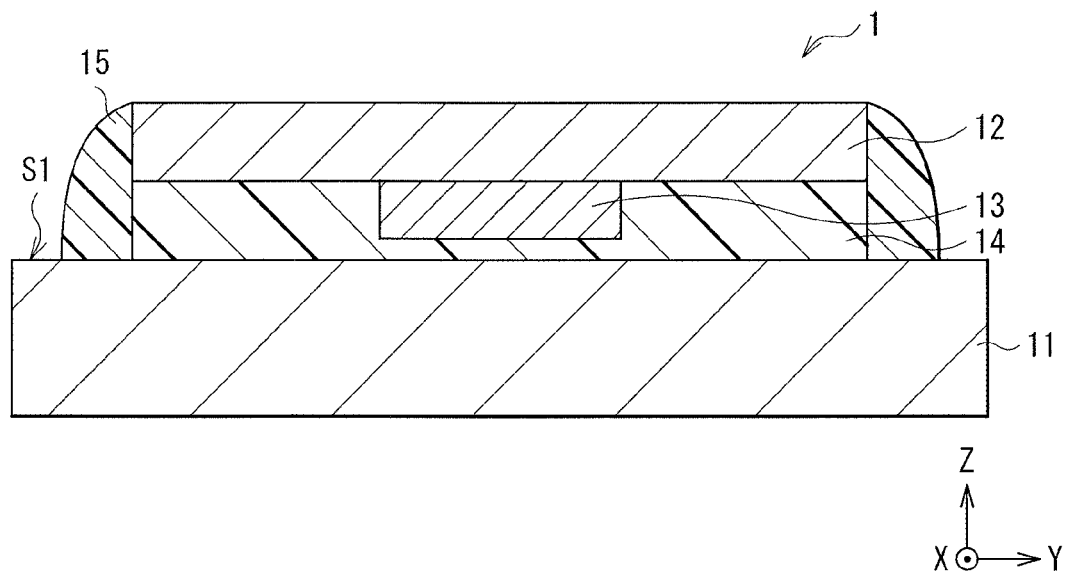
FIG. 1 is a cross-sectional schematic view of an example of a configuration of a phosphor wheel according to a first embodiment of the present disclosure.
Figure 2:
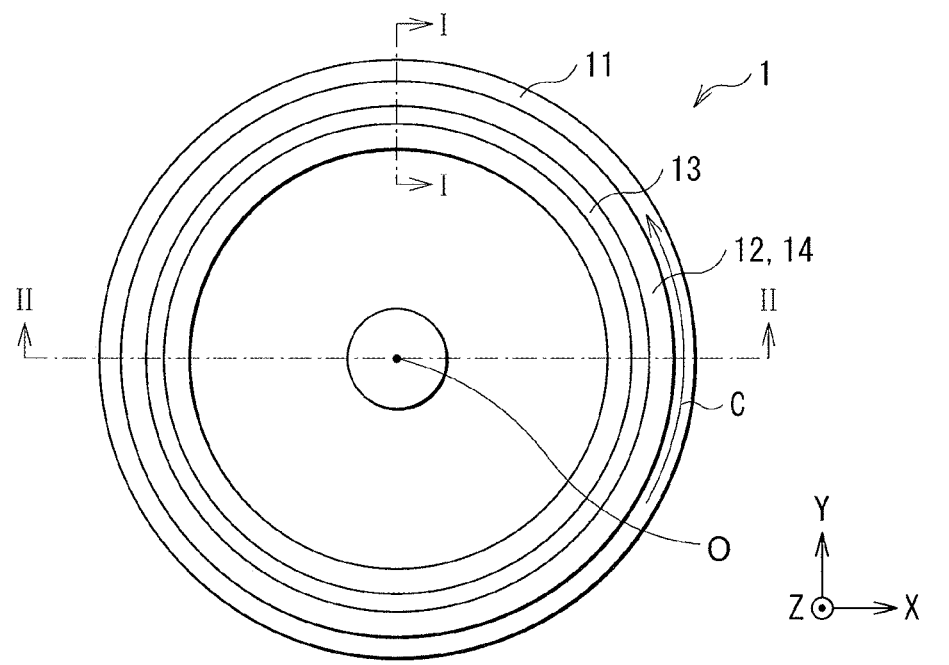
FIG. 2 is a planar schematic view of the entire phosphor wheel illustrated in FIG. 1.
Figure 3:
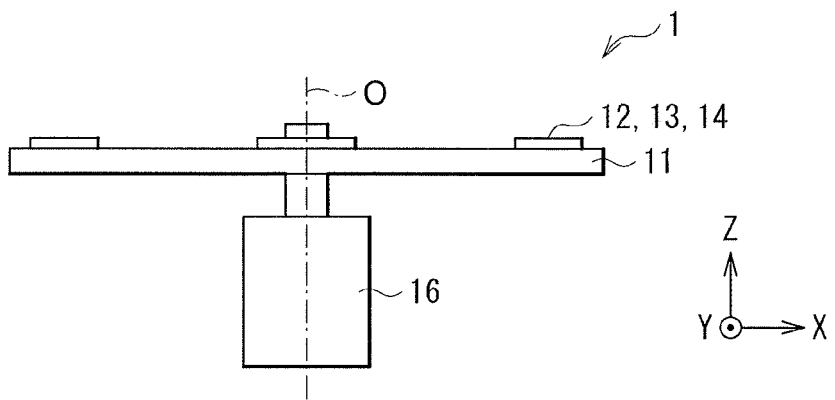
FIG. 3 is a cross-sectional schematic view of the entire phosphor wheel illustrated in FIG. 1.

FIG. 1 schematically illustrates an example of a cross-sectional configuration of a wavelength conversion element (a phosphor wheel 1) according to a first embodiment of the present disclosure. FIG. 2 schematically illustrates a planar configuration of the entire phosphor wheel 1 illustrated in FIG. 1, and FIG. 1 illustrates a cross-sectional configuration taken along a line I-I illustrated in FIG. 2. FIG. 3 schematically illustrates a cross-sectional configuration of the entire phosphor wheel 1 that is taken along a line II-II illustrated in FIG. 2. The phosphor wheel 1 is included in, for example, a light source unit (a light source unit 100) of a projection display (a projector 10) to be described later (see FIGS. 8 and 9). The phosphor wheel 1 of the present embodiment is configured in such a manner that a quantum-dot layer 13 is disposed between a phosphor layer 12 provided on a surface S1 side of a substrate 11 and the substrate 11.

1-1. Configuration of Phosphor Wheel

The phosphor wheel 1 of the present embodiment has a configuration in which the quantum-dot layer 13 is provided between the phosphor layer 12 and the substrate 11. The phosphor layer 12 is provided on the substrate 11, and the substrate 11 is rotatable around a rotation axis (for example, an axis 16J). For example, the quantum-dot layer 13 is sealed by a binder layer 14 between the substrate 11 and the phosphor layer 12. The phosphor layer 12, the quantum-dot layer 13, and the binder layer 14 are provided on a light entrance surface (the surface S1) side of the substrate 11, and are disposed in this order relative to a light source section 110 to be described later. Further, a gas barrier material 15 is provided on side surfaces of the phosphor layer 12, the quantum-dot layer 13, and the binder layer 14.

The substrate 11 supports the phosphor layer 12 and the quantum-dot layer 13, and has, for example, a disk shape. Further, it is preferable that the substrate 11 have a function acting as a heat dissipation member, and the substrate 11 includes a metallic material that exhibits high thermal conductivity and is capable of being mirror-finished, or an inorganic material such as a ceramic material. Examples of a constituent material for the substrate 11 include elementary metals such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh), and palladium (Pd), or an alloy containing one or more kinds thereof. As an alternative, an alloy such as CuW that contains 80 atomic percentage or more of W, or CuMo that contains 40 atomic percentage or more of Mo is also usable as a metallic material included in the substrate 11. Examples of the ceramic material include a material that contains silicon carbide (SiC), aluminum nitride (AlN), beryllium oxide (BeO), a composite material of Si and SiC, or a composite material of SiC and Al (only a material that contains 50% or more of SiC). The substrate 11 is rotatable in a direction of an arrow C through the use of, for example, a motor 16 using a normal line passing through a center of the substrate 11 as a rotation axis O.

The phosphor layer 12 includes a plurality of phosphor particles, and is preferably formed in a plate-like shape, for example. The phosphor layer 12 includes, for example, a so-called ceramics phosphor. The phosphor layer 12 is formed, for example, in an annular shape on the substrate 11. The phosphor particle is a particulate phosphor that absorbs exciting light EL1 to applied from the light source section 110 to emit fluorescent light FL1. The phosphor particle uses, for example, a fluorescent material that is excited by a laser beam having a wavelength in a blue wavelength band (for example, 400 nm to 470 nm) to emit yellow fluorescent light (light in a wavelength band between a red wavelength band and a green wavelength band). Examples of such a fluorescent material include a YAG (Yttrium Aluminum Garnet)-based material. It is preferable that an average particle size of the phosphor particle be, for example, at least 5 μm but no more than 40 μm, and that the phosphor layer 12 be formed with a thickness of, for example, at least 40 μm but no more than 200 μm.

Figure 4:
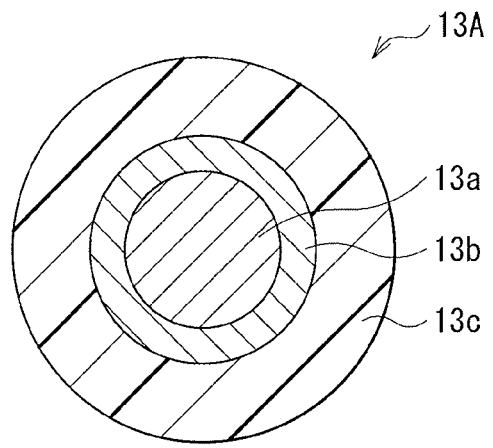
FIG. 4 is a cross-sectional view of a configuration of a quantum dot.

The quantum-dot layer 13 includes a plurality of quantum dots 13A. FIG. 4 illustrates a cross-sectional configuration of the quantum dot 13A. The quantum dot 13A is typically a particle having a particle size of several nanometers, and includes, for example, a core section 13a that includes a nanosized compound semiconductor such as CdSe/ZnS; a shell layer 13b that is provided around the core section 13a; and a coating layer 13c with which the shell layer 13b is coated. The shell layer 13b includes, for example, a semiconductor having a bandgap larger than that of the compound semiconductor included in the core section 13a. The coating layer 13c prevents reduction in emission intensity that is caused by aggregation or oxidation of the quantum dots 13A (specifically, the core section 13a), and includes, for example, a ligand that includes hydrocarbon, a silicon oxide film (an $SiO_2$ film), or an aluminum oxide film (an $Al_2O_3$ film). The coating layer 13c has a thickness of, for example, 1 nm or more.

The binder layer 14 seals the quantum-dot layer 13, as well as joins the substrate 11 and the phosphor layer 12 with each other. Preferably, the binder layer 14 has, for example, both light transmission property (in particular, visible light transmission property) and light resistance. Further, the binder layer 14 preferably has gas barrier property. Examples of a constituent material for the binder layer 14 include a silicon resin, an epoxy resin, low-melting-point glass such as liquid glass, silicon oxide ($SiO_2$), and aluminum oxide ($Al_2O_3$).

Figure 5:
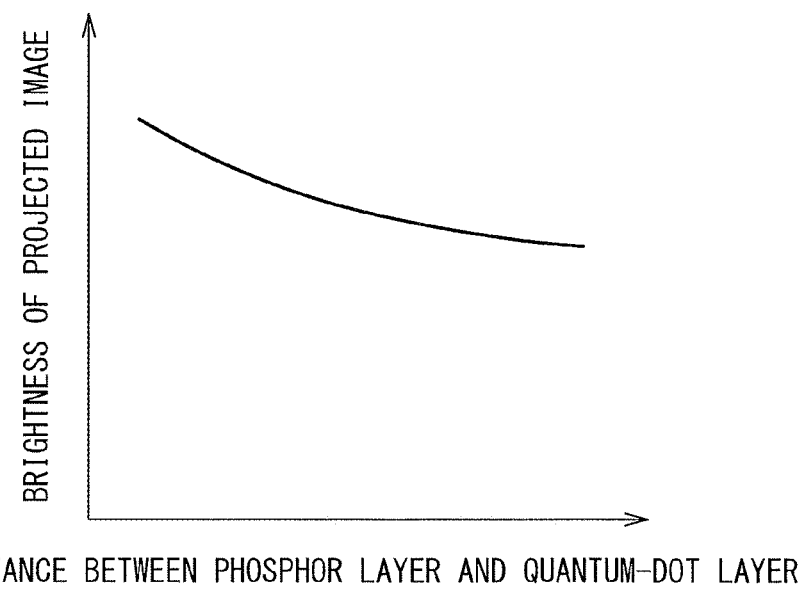
FIG. 5 is a characteristic diagram illustrating a relationship between a distance from a phosphor layer to a quantum-dot layer and brightness of a projected image.

For example, the quantum-dot layer 13 of the present embodiment may have a configuration in which the quantum dots 13A illustrated in FIG. 4 are filled densely in a space formed in the binder layer 14, or may have a configuration in which such quantum dots 13A are dispersed in the binder layer 14. Further, a distance between the phosphor layer 12 and the quantum-dot layer 13 is preferably as small as possible. FIG. 5 illustrates a relationship between the distance from the phosphor layer 12 to the quantum-dot layer 13 and brightness of a projected image. A smaller distance between the phosphor layer 12 and the quantum-dot layer 13 makes it possible to improve efficiency of optical systems used to a point of illuminating spatial modulation elements such as a LCD, an LCOS, and a DMD to be described later with light emitted in the phosphor layer 12 and the quantum-dot layer 13. Further, the quantum-dot layer 13 may include particles such as titanium oxide ($TiO_2$) that scatter light. Containing the particles for scattering light allows light emitted in the quantum dots 13A to be efficiently taken out of the quantum-dot layer 13.

The gas barrier material 15 suppresses intrusion of oxygen or moisture into the quantum-dot layer 13, and is provided from a top surface of the substrate 11 to an end surface of the phosphor layer 12. Examples of a constituent material for the gas barrier material 15 include any of single-layer films of $SiO_2$, SiN, $AL_2O_3$, and ALO, a composite film in which two or more kinds of the above-described materials are combined, and the like. It is to be noted that, in a case where the binder layer 14 has gas barrier property sufficiently, the gas barrier material 15 may be omitted.

The motor 16 perform rotary drive of the phosphor wheel 1 at a predetermined number of rotations. The motor 16 drives the phosphor wheel 1 to rotate the phosphor layer 12 and the quantum-dot layer 13 in a plane orthogonal to an irradiation direction of exciting light EL to be emitted from the light source section 110 to be described later. As a result, a position of the phosphor wheel 1 irradiated with the exciting light EL changes (moves) temporally at speed corresponding to the number of rotations in the plane orthogonal to the irradiation direction of the exciting light.

Figure 6:
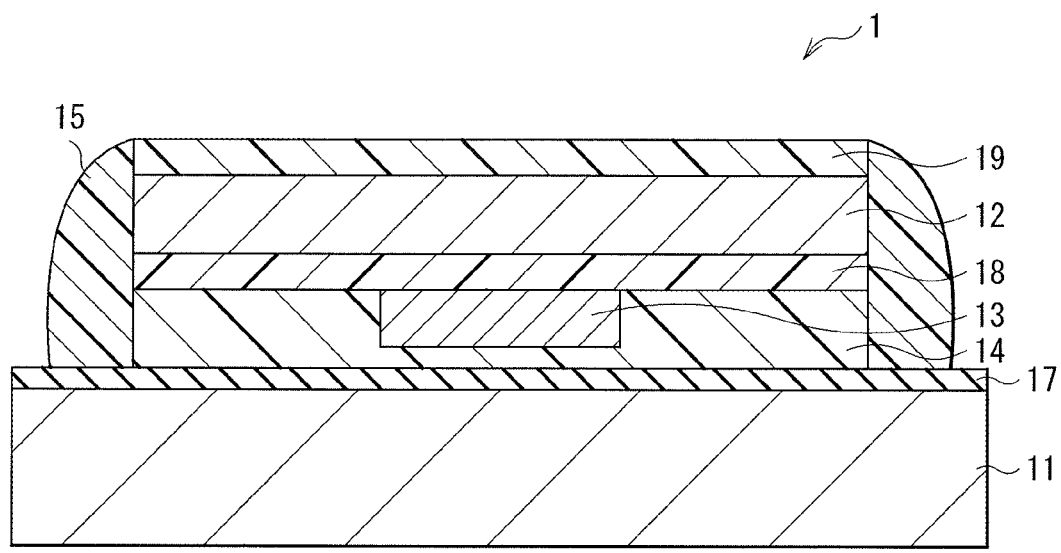
FIG. 6 is a cross-sectional schematic view of another example of a configuration of the phosphor wheel according to the first embodiment of the present disclosure.

Further, the phosphor wheel 1 of the present embodiment may be provided with members other than those described above. FIG. 6 schematically illustrates another example of a cross-sectional configuration of the phosphor wheel 1 of the present embodiment.

For example, as illustrated in FIG. 6, the phosphor wheel 1 is preferably provided with a reflecting layer 17 that is formed on the surface S1 side of the substrate 11. The reflecting layer 17 includes, for example, a metallic film containing a metal element such as aluminum (Al), silver (Ag), or titanium (Ti) and the like, in addition to a dielectric multi-layer film. The reflecting layer 17 functions to reflect the exciting light EL1 to be applied from the light source section 110, as well as fluorescent light FL1 and fluorescent light FL2 (see FIG. 8) each of which is converted in the phosphor layer 12 and the quantum-dot layer 13 for improving emission efficiency in the phosphor wheel 1. It is to be noted that, in a case where the reflecting layer 17 is formed, the substrate 11 may not have light reflection property. In such a case, it is possible for the substrate 11 to use quartz or glass in addition to a simple substance of Si, SiC, and a crystalline material such as diamond and sapphire.

Further, for example, as illustrated in FIG. 6, the phosphor wheel 1 may be provided with an optical thin film 18 between the phosphor layer 12 and the quantum-dot layer 13. Preferably, the optical thin film 18 has a function of, for example, reducing reflection loss of light that is subjected to wavelength conversion in a quantum-dot layer in an interface between the phosphor layer 12 and the quantum-dot layer 13. As an alternative, the optical thin film 18 preferably has a function of reflecting a short wavelength (for example, a wavelength of at least 350 nm but no more than 480 nm, for example, blue light), which makes it possible to reduce deterioration in the quantum dots 13A.

Additionally, for example, as illustrated in FIG. 6, the phosphor wheel 1 may be provided with an optical thin film 19 on a front surface of the phosphor layer 12. The optical thin film 19 preferably has a function of reducing reflection loss of visible light (specifically, the exciting light EL to be emitted from the light source section 110) in an interface between ambient air and the phosphor layer 12, and more specifically, an antireflection film is preferably provided. As an alternative, the optical thin film 19 preferably has a function of reflecting a fixed percentage of the exciting light EL, and, for example, dichroic coating is preferably applied onto the front surface of the phosphor layer 12.

Figure 7:
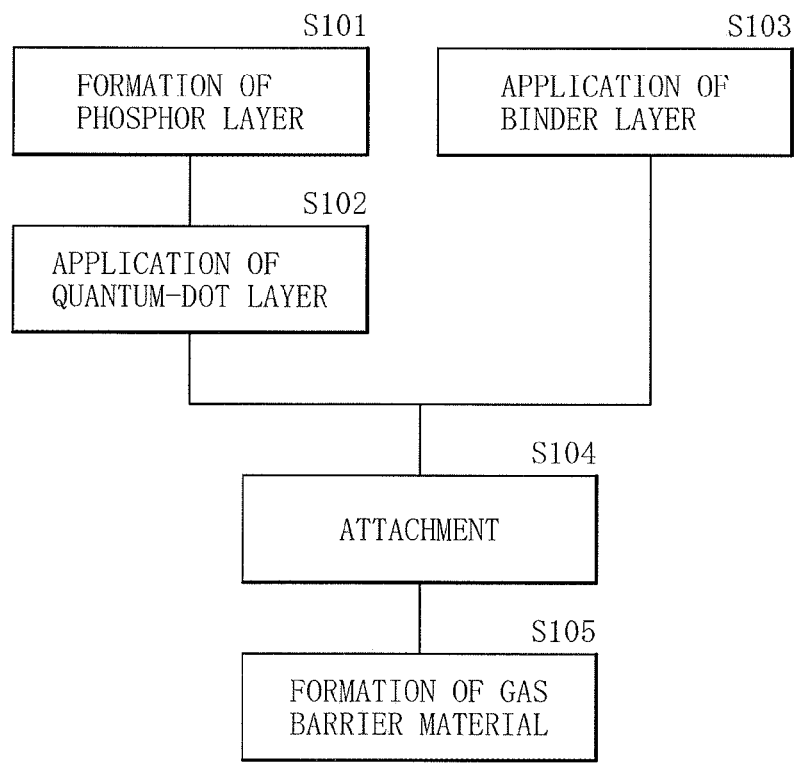
FIG. 7 is a flowchart for describing a manufacturing process of the phosphor wheel illustrated in FIG. 1.

It is possible to manufacture the phosphor wheel 1 of the present embodiment in the following manner, for example. FIG. 7 illustrates a flow of a manufacturing process of the phosphor wheel 1.

First, the phosphor layer 12 is formed (Step S101). In a case where the phosphor layer 12 includes a ceramics phosphor, the phosphor layer 12 is foil led using, for example, a method given below. First, phosphor powder is obtained using a coprecipitation method, a solid-phase reaction method, a gas-phase reaction method of a variety of gases and a solid substance, or the like, and thereafter the powder is fired at an appropriate temperature to process a particle size, composition, uniformity, an internal defect, etc. The obtained phosphor powder is shaped in an appropriate form using, for example, a rubber press, and thereafter is subjected to an HIP treatment. Accordingly, the ceramics phosphor (the phosphor layer 12) is obtained. Subsequently, the quantum-dot layer 13 is formed on the phosphor layer 12 by coating (Step S102). Next, a silicon layer serving as the binder layer 14 is applied onto the surface S1 of the substrate 11 (Step S103). Thereafter, the quantum-dot layer 13 and the binder layer 14 are attached to each other (Step S104). Finally, the gas barrier material 15 is formed on the surface S1 of the substrate 11 from the binder layer 14 to the phosphor layer 12 (Step S105). Thus, the phosphor wheel 1 is completed. It is to be noted that the steps are preferably performed under an inert atmosphere to prevent deterioration in quantum dots due to oxidation.

1-2. Configuration of Light Source Unit

Figure 8:
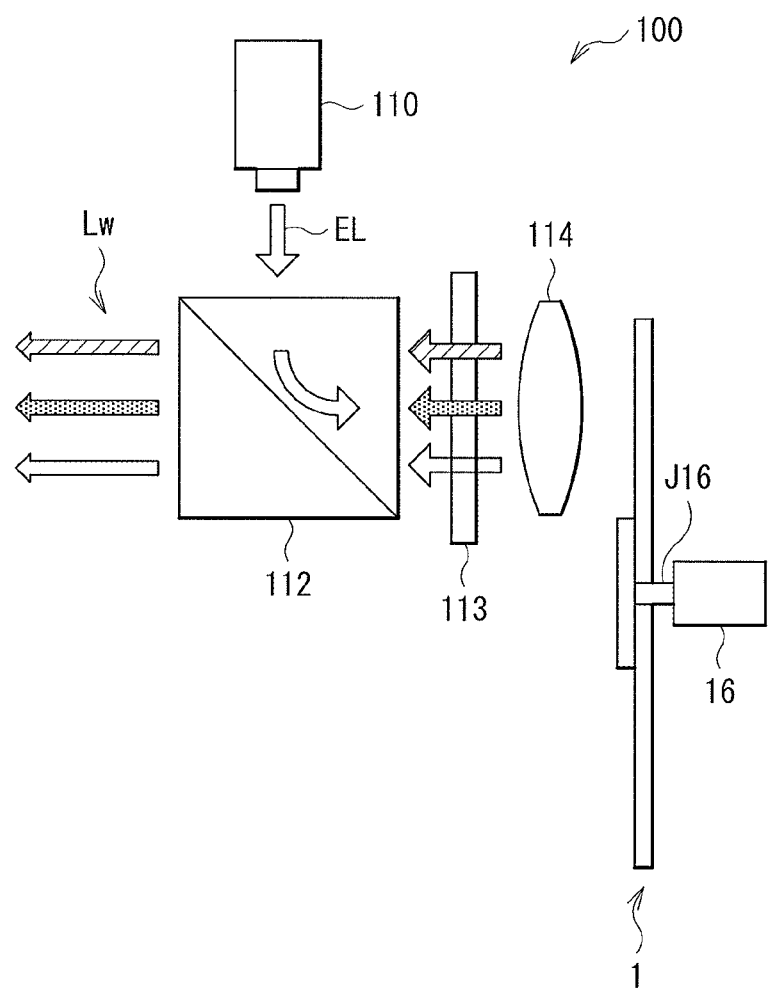
FIG. 8 is a simplified diagram illustrating a configuration example of a light source unit having the phosphor wheel illustrated in FIG. 1.

FIG. 8 is a simplified diagram illustrating an entire configuration of the light source unit 100. The light source unit 100 includes the phosphor wheel 1, the light source section 110, a polarizing beam splitter (PBS) 112, a quarter-wavelength plate 113, and a light collection optical system 114. The phosphor wheel 1 is, for example, a reflective wavelength conversion element, and is rotatably supported by the axis J16. Each of members included in the above-described light source unit 100 is disposed on an optical path of light (multiplexed light Lw) to be emitted from the phosphor wheel 1 in order of the light collection optical system 114, the quarter-wavelength plate 113, and the PBS 112 from the phosphor wheel 1 side. The light source section 110 is disposed at a position that is located in a direction orthogonal to the optical path of the multiplexed light Lw and that is opposed to one light entrance surface of the PBS 112.

The light source section 110 includes a solid-state light-emitting element that emits light of a predetermined wavelength. In the present embodiment, as the solid-state light-emitting element, a semiconductor laser element is used that oscillates the exciting light EL (for example, a blue laser beam with a wavelength of 445 nm or 455 nm), and the linearly-polarized (S-polarized) exciting light EL is emitted from the light source section 110.

It is to be noted that, in a case where the light source section 110 is configured using the semiconductor laser element, the light source section 110 may have a configuration in which the exciting light EL of a predetermined output is obtained with use of one semiconductor laser element, or may have a configuration in which the exciting light EL of a predetermined output is obtained by multiplexing light emitted from a plurality of the semiconductor laser elements. Further, a wavelength of the exciting light EL is not limited to the above-described value, and it is possible to use any wavelength within a wavelength band of light called blue light.

The PBS 112 separates the exciting light EL incoming from the light source section 110 and the multiplexed light Lw incoming from the phosphor wheel 1 from each other. Specifically, the PBS 112 reflects the exciting light EL incoming from the light source section 110 toward the quarter-wavelength plate 113. Further, the PBS 112 allows the multiplexed light Lw incoming through the light collection optical system 114 and the quarter-wavelength plate 113 from the phosphor wheel 1 to be transmitted therethrough, and the transmitted multiplexed light Lw enters an illumination optical system 200 (to be described later).

The quarter-wavelength plate 113 is a retardation element that causes a phase shift of $\pi/2$ relative to incoming light, and converts linearly polarized light into circularly polarized light in a case where the incoming light is linearly polarized light, while converts circularly polarized light into linearly polarized light in a case where the incoming light is circularly polarized light. In the present embodiment, the linearly polarized exciting light EL to be outputted from the polarizing beam splitter 112 is converted into the circularly polarized exciting light EL by the quarter-wavelength plate 113. Further, an exciting light component of circularly polarized light that is included in the multiplexed light Lw to be outputted from the phosphor wheel 1 is converted into linearly polarized light by the quarter-wavelength plate 113.

The light collection optical system 114 collects the exciting light EL outputted from the quarter-wavelength plate 113 on a predetermined spot diameter to output the collected exciting light EL toward the phosphor wheel 1. Further, the light collection optical system 114 converts the multiplexed light Lw to be outputted from the phosphor wheel 1 into parallel light, and outputs the parallel light toward the quarter-wavelength plate 113. It is to be noted that, for example, the light collection optical system 114 may include a single collimating lens, or may have a configuration in which incoming light is converted into parallel light with use of a plurality of lenses.

It is to be noted that a configuration of an optical member that separates the exciting light EL incoming from the light source section 110 and the multiplexed light Lw to be outputted from the phosphor wheel 1 from each other is not limited to the PBS 112, and it is possible to use any optical member as long as a configuration allows for light separating operation described above. Further, a cooling fan may be provided inside the light source unit 100 to reduce heat generation of the phosphor layer 12 and the quantum-dot layer 13 that is caused in association with irradiation with the exciting light EL.

1-3. Configuration of Projector

Figure 9:
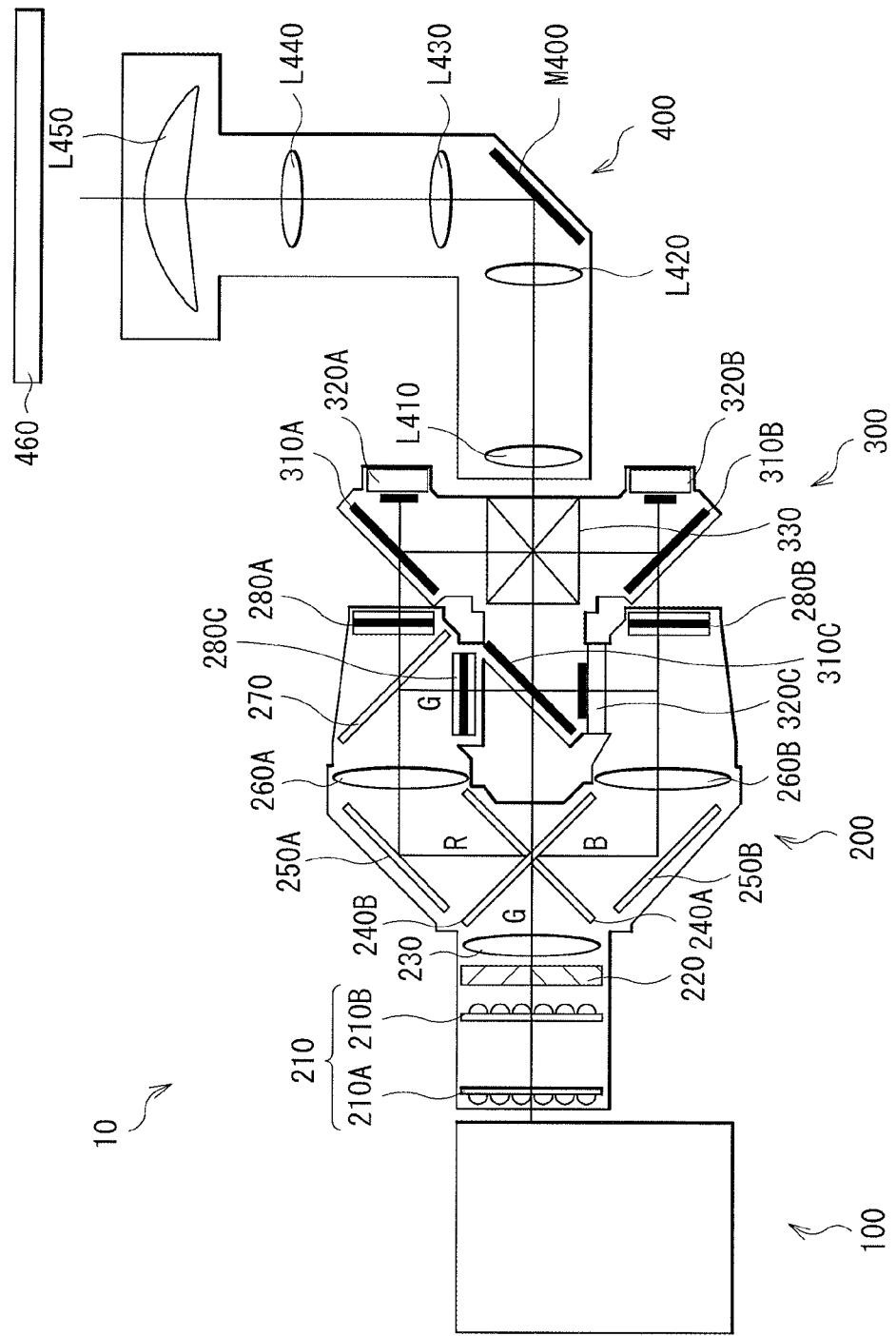
FIG. 9 is a schematic view of a configuration example of a projector that includes the light source unit illustrated in FIG. 8.

Next, description is provided on a projection display (the projector 10) of the present disclosure. FIG. 9 is a simplified diagram illustrating an entire configuration of the projector 10 that includes the light source unit 100 illustrated in FIG. 8 as a light source optical system. It is to be noted that hereinafter description is provided on an example of a reflective 3LCD projector that performs light modulation with use of a reflective liquid crystal panel (LCD). It is to be noted that the phosphor wheel 1 is also applicable to a projector that uses a transmissive liquid crystal panel, a digital micromirror device (DMD: Digital Micromirror Device), or the like in place of the reflective liquid crystal panel.

As illustrated in FIG. 9, the projector 10 includes the above-described light source unit 100, an illumination optical system 200, an image-forming section 300, and a projection optical system 400 (a projecting optical system) in this order.

The illumination optical system 200 includes, for example, a fly-eye lens 210 (210A and 210B), a polarization conversion element 220, a lens 230, dichroic mirrors 240A and 240B, reflecting mirrors 250A and 250B, lenses 260A and 260B, a dichroic mirror 270, and polarizing plates 280A to 280C from a position closer to the light source unit 100.

The fly-eye lens 210 (210A and 210B) equalizes an illuminance distribution of white light from the light source unit 100. The polarization conversion element 220 functions to align a polarizing axis of incoming light in a predetermined direction. For example, the polarization conversion element 220 converts light other than P-polarized light into P-polarized light. The lens 230 collects light from the polarization conversion element 220 toward the dichroic mirrors 240A and 240B. The dichroic mirrors 240A and 240B selectively reflect light in a predetermined wavelength band, and selectively allow light in any other wavelength band to be transmitted therethrough. For example, the dichroic mirror 240A mainly reflects red light toward the reflecting mirror 250A. Further, the dichroic mirror 240B mainly reflects blue light toward the reflecting mirror 250B. Accordingly, mainly green light is transmitted through both the dichroic mirrors 240A and 240B to be headed to a reflective polarizing plate 310C (to be described later) of the image-forming section 300. The reflecting mirror 250A reflects light (mainly, the red light) from the dichroic mirror 240A toward the lease 260A, and the reflecting mirror 250B reflects light (mainly, the blue light) from the dichroic mirror 240B toward the lens 260B. The lens 260A allows light (mainly, the red light) from the reflecting mirror 250A to be transmitted therethrough and be collected on the dichroic mirror 270. The lens 260B allows light (mainly, the blue light) from the reflecting mirror 250B to be transmitted therethrough and to be collected on the dichroic mirror 270. The dichroic mirror 270 selectively reflects the green light, and selectively allows light in any other wavelength band to be transmitted therethrough. Here, the dichroic mirror 270 allows a red light component of light from the lens 260A to be transmitted therethrough. In a case where the light from the lens 260A includes a green light component, the dichroic mirror 270 reflects the green light component toward the polarizing plate 280C. The polarizing plates 280A to 280C include polarizers each having a polarizing axis in a predetermined direction. For example, in a case where incoming light is converted into P-polarized light in the polarization conversion element 220, the polarizing plates 280A to 280C allow the P-polarized light to be transmitted therethrough, and reflect S-polarized light.

The image-forming section 300 includes reflective polarizing plates 310A to 310C, reflective liquid crystal panels 320A to 320C (light modulation elements), and a dichroic prism 330.

The reflective polarizing plates 310A to 3100 allow light (for example, P-polarized light) having polarizing axes that are respectively identical to polarizing axes of polarized light from the polarizing plates 280A to 280C to be transmitted therethrough, and reflect light (S-polarized light) having any other polarizing axes. Specifically, the reflective polarizing plate 310A allows red light of the P-polarized light from the polarizing plate 280A to be transmitted therethrough toward a direction of the reflective liquid crystal panel 320A. The reflective polarizing plate 310B allows blue light of the P-polarized light from the polarizing plate 280B to be transmitted therethrough toward a direction of the reflective liquid crystal panel 320B. The reflective polarizing plate 310C allows green light of the P-polarized light from the polarizing plate 280C to be transmitted therethrough toward a direction of the reflective liquid crystal panel 320C. Further, the green light of the P-polarized light that has transmitted through both the dichroic mirrors 240A and 240B to enter the reflective polarizing plate 310C is transmitted through the reflective polarizing plate 310C as it is to enter the dichroic prism 330. In addition, the reflective polarizing plate 310A reflects red light of the S-polarized light from the reflective liquid crystal panel 320A to cause the red light to enter the dichroic prism 330. The reflective polarizing plate 310B reflects blue light of the S-polarized light from the reflective liquid crystal panel 320B to cause the blue light to enter the dichroic prism 330. The reflective polarizing plate 310C reflects green light of the S-polarized light from the reflective liquid crystal panel 320C to cause the green light to enter the dichroic prism 330.

The reflective liquid crystal panels 320A to 320C perform spatial modulation of red light, blue light, and green light, respectively.

The dichroic prism 330 synthesizes the incoming red light, the incoming blue light, and the incoming green light, and outputs thus-synthesized light toward the projection optical system 400.

The projection optical system 400 includes lenses L410 to L450, and a mirror M400. The projection optical system 400 enlarges light outputted from the image-forming section 300 to project the enlarged light on a screen 460, or the like.

Operation of Light Source Unit and Projector

Next, operation of the projector 10 including the light source unit 100 is described with reference to FIG. 8 and FIG. 9.

First, the motor 16 is driven in the light source unit 100, and the phosphor wheel 1 rotates. Thereafter, the exciting light EL is oscillated from the light source unit 100 toward the PBS. The exciting light EL is reflected by the PBS 112, and thereafter the exciting light EL is transmitted through the quarter-wavelength plate 113 and the light collection optical system 114 in this order to be applied to the phosphor wheel 1.

In the phosphor wheel 1, a portion of the exciting light EL (blue light) is absorbed in the phosphor layer 12, and is converted into light in a predetermined wavelength band (the fluorescent light FL1; yellow light). A portion of the fluorescent light FL1 that is emitted in the phosphor layer 12 is diffused along with a portion of the exciting light EL that is not absorbed in the phosphor layer 12, and is reflected toward the light collection optical system 114 side. The fluorescent light FL2 and the exciting light EL that are not reflected toward the light collection optical system 114 side in the phosphor layer 12 are absorbed in the quantum-dot layer 13, and are converted into light in a predetermined wavelength band (the fluorescent light FL2; red light). In other words, the phosphor wheel 1 of the present embodiment emits light in a wavelength band (for example, 480 nm to 680 nm) including yellow light and red light. A portion of the fluorescent light FL2 that is emitted in the quantum-dot layer 13 is diffused along with the fluorescent light FL2 and the exciting light EL that are not absorbed in the quantum-dot layer 13, and is reflected toward the light collection optical system 114 side. In a case where the substrate 11 and the reflecting layer 17 are provided, the fluorescent light FL2, the fluorescent light FL2, and the exciting light EL that are not reflected toward the light collection optical system 114 side in the quantum-dot layer 13 are reflected toward the light collection optical system 114 side by the reflecting layer 17.

It is to be noted that, in a case where, for example, the optical thin film 19 (for example, dichroic coating) having a function of reflecting a fixed percentage of the exciting light EL is provided on the front surface of the phosphor layer 12 as described above, a portion of the exciting light EL is reflected toward the light collection optical system 114 side by the optical thin film 19.

As a result, in the phosphor wheel 1, the fluorescent light FL1, the fluorescent light FL2, and a portion of the exciting light EL are multiplexed to generate white light, and the white light (the multiplexed light Lw) is outputted toward the light collection optical system 114.

Subsequently, the multiplexed light Lw is transmitted through the light collection optical system 114, the quarter-wavelength plate 113, and the PBS 112 to enter the illumination optical system 200.

The multiplexed light Lw (the white light) incoming from the light source unit 100 is transmitted through the fly-eye lens 210 (210A and 210B), the polarization conversion element 220, and the lens 230 in sequence, and thereafter reaches the dichroic mirrors 240A and 240B.

The dichroic mirror 240A reflects red light mainly, and the red light is transmitted through the reflecting mirror 250A, the lens 260A, the dichroic mirror 270, the polarizing plate 280A, and the reflective polarizing plate 310A in sequence to reach the reflective liquid crystal panel 320A. The red light is subjected to spatial modulation in the reflective liquid crystal panel 320A, and thereafter is reflected by the reflective polarizing plate 310A to enter the dichroic prism 330. It is to be noted that, in a case where light reflected to the reflecting mirror 250A by the dichroic mirror 240A includes a green light component, the green light component is reflected by the dichroic mirror 270, and is transmitted through the polarizing plate 280C and the reflective polarizing plate 310C in sequence to reach the reflective liquid crystal panel 320C. The dichroic mirror 240B reflects blue light mainly, and the blue light enters the dichroic prism 330 through a similar process. The green light having been transmitted through the dichroic mirrors 240A and 240B also enters the dichroic prism 330.

The red light, the blue light, and the green light that enter the dichroic prism 330 are synthesized, and thereafter thus-synthesized light is outputted as image light toward the projection optical system 400. The projection optical system 400 enlarges the image light from the image-forming section 300 to project the enlarged image light on a screen 460, or the like.

1-4. Workings and Effects

As described above, in recent years, in a solid-state light source for a projector, a method has been prevailing that derives red light and green light by exciting a Ce-YAG phosphor, and then cutting unnecessary wavelengths from fluorescence with use of a filter. However, a color gamut in such a method is as narrow as about 60% in the BT202 specifications. Further, in a case where display is performed using the D65 that is defined as a white point in the sRGB specifications, a red light component of fluorescent light becomes a rate-limiting factor. This has caused an issue of wasting a green light component of the fluorescence by about 30%, resulting in deterioration in light source efficiency.

Accordingly, a technology has been developed that enhances a red light component and improves brightness in a wide color gamut by causing exciting light to enter a Ce-YAG phosphor, and disposing a red phosphor on the backside thereof. However, effects of such a technology are not considered sufficient, and an improvement in luminance under a condition in which density of the exciting light is relatively low remain slight. Therefore, under a condition in which light density is high, it is inferred that an improvement in luminance is further degraded due to luminance saturation of the red phosphor.

Incidentally, a wider color gamut is desired in a light source for a projector. A wavelength conversion material of a solid-state light source incudes a quantum dot apart from a phosphor. The quantum dot allows a peak wavelength to be a wavelength with high spectral efficiency, and further allows an emission wavelength width to be narrowed to a degree of causing no speckle. Further, the quantum dot is short in a fluorescence lifetime; therefore, the quantum dot is less likely to cause luminance saturation, and has superior quantum efficiency. Accordingly, it is possible to achieve a light source having a wide color gamut and high brightness in a case where the quantum dot is used for the wavelength conversion material of the solid-state light source. However, in a case where the quantum dot is used under a condition in which density of the exciting light is high, there is an issue that a lifetime of a light source is shorten due to deterioration. Further, as compared with a typical phosphor such as a YAG phosphor and an SCASN phosphor, the quantum dot has an issue that an emission wavelength varies significantly depending on intensity and temperature of exciting light.

In contrast, in the present embodiment, the phosphor layer 12 that includes the plurality of phosphor particles is provided on the surface S1 serving as an entrance surface of the exciting light EL1 emitted from the light source section 110 of the substrate 11, and the quantum-dot layer 13 that includes the plurality of quantum dots is provided between the phosphor layer 12 and the substrate 11. This causes the exciting light EL1 to first enter the phosphor layer 12, and the fluorescent light FL1 converted in the phosphor layer 12 is used as exciting light in the quantum-dot layer 13. This allows for reduction in Stokes loss, which makes it possible to suppress an increase in temperature of the quantum-dot layer 13 and to reduce a change in an emission wavelength.

Figure 10:
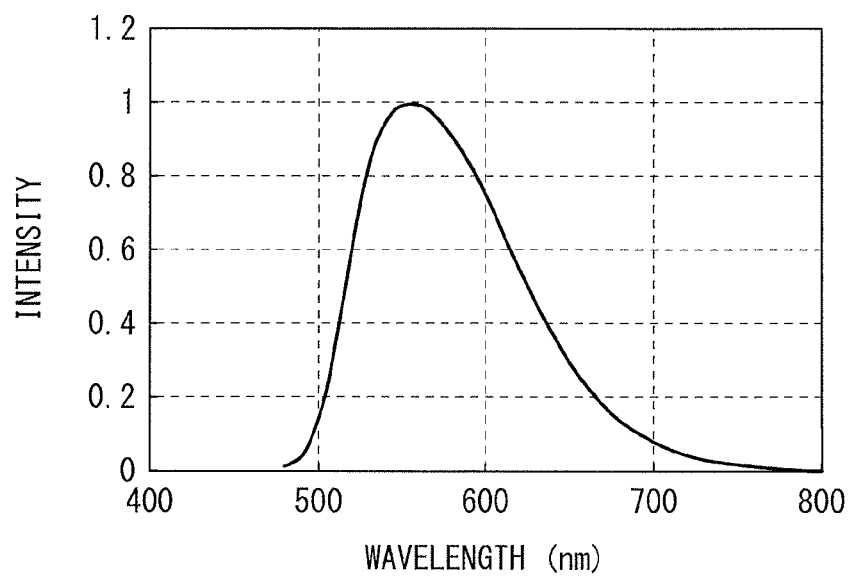
FIG. 10 is a spectrum diagram of light to be emitted from a phosphor wheel that is provided with only a phosphor layer on a substrate.
Figure 11:
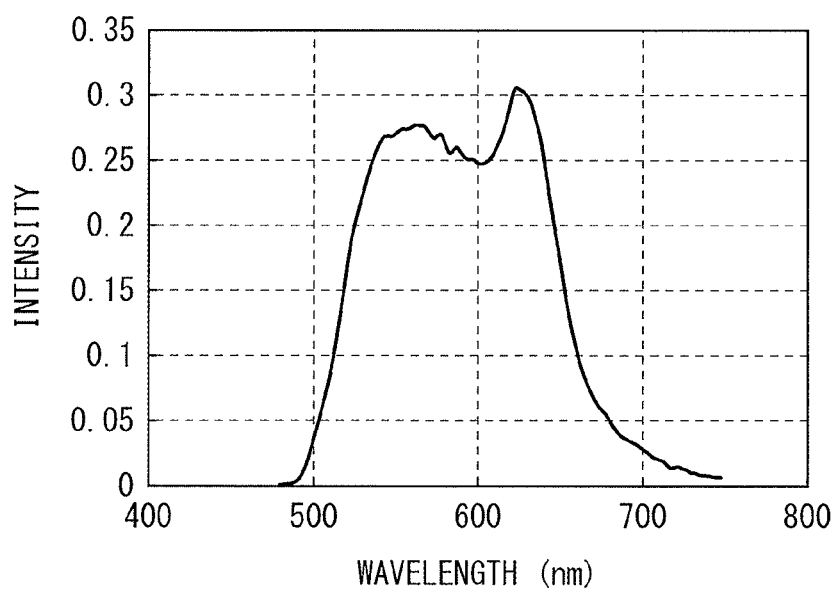
FIG. 11 is a spectrum diagram of light outputted from a phosphor wheel having the configuration illustrated in FIG. 1.

FIG. 10 is a spectrum diagram in a case where only the phosphor layer 12 is formed on the substrate 11, and FIG. 11 is a spectrum diagram of light outputted from the phosphor wheel 1. As illustrated in FIG. 11, in the phosphor wheel 1 of the present embodiment, the fluorescent light FL2 (red light) outputted from the quantum-dot layer 13 is added to the fluorescent light FL1 (yellow light) outputted from the phosphor layer 12, which makes it possible to widen a color in comparison with FIG. 10.

Thus, in the light source unit 100 of the present embodiment, the quantum-dot layer 13 is disposed between the phosphor layer 12 that is provided on the substrate 11 of the phosphor wheel 1 and the substrate 11; therefore, the exciting light EL1 emitted from the light source section 110 is first converted into the fluorescent light FL1 in the phosphor layer 12, and a portion of the fluorescent light FL1 is absorbed in the quantum-dot layer 13 to be converted into the fluorescent light FL2. This results in suppression of an increase in temperature of the quantum-dot layer 13, and reduction in changes in an emission output and an emission wavelength. Consequently, the phosphor wheel 1 makes it possible to achieve light emission with a wide color gamut and less color change, as illustrated in FIG. 11.

Figure 12:
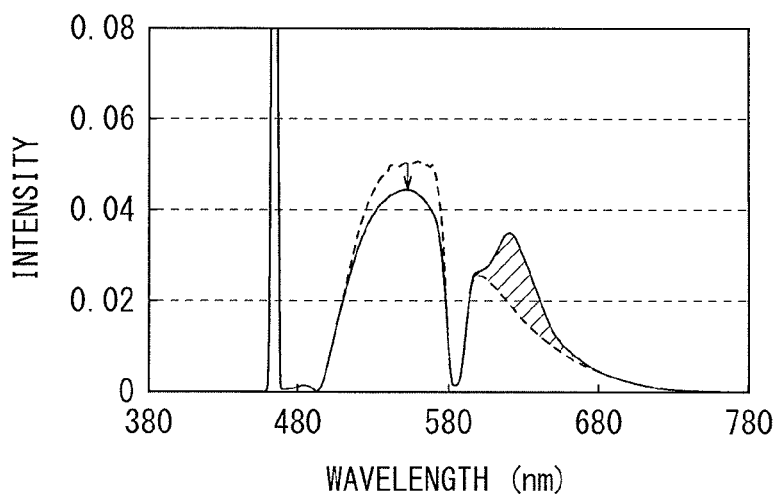
FIG. 12 is a characteristic diagram illustrating a spectrum of light emitted from a typical light source unit and a spectrum of light emitted from the light source unit illustrated in FIG. 8.

FIG. 12 illustrates a spectrum of light emitted from a typical light source unit and a spectrum of light emitted from the light source unit 100 of the present embodiment. The spectrum of the light emitted from the light source unit 100 of the present embodiment is indicated with a solid line, and the spectrum of the light emitted from the typical light source unit is indicated with a dotted line. Further, the typical light source unit includes a phosphor wheel in which a phosphor layer is formed on a substrate. In the light source unit 100 of the present embodiment, as illustrated in FIG. 12, although a red light component increases as compared with the typical light source unit, a green light component decreases. However, the green light component is discarded to achieve a color balance in a light source unit using a typical phosphor wheel. Therefore, the light source unit of the present embodiment makes it possible to enhance luminance under a condition of a wide color gamut.

Further, in a projector including the projector 10 of the present embodiment that uses a quantum dot as a wavelength conversion material, light having a high absorption rate such as blue light of a wavelength of, for example, 445 nm to 465 nm or light of a further shorter wavelength is used as exciting light. However, in the light of a short wavelength as described above, organic molecules that form a ligand portion of a quantum dot are likely to deteriorate. Further, there is a possibility that a binding state at an interface between a core section and a shell layer inside the quantum dot varies, resulting in deterioration in wavelength conversion efficiency. In contrast, the phosphor wheel 1 of the present embodiment uses the fluorescent light FL1 converted in the phosphor layer 12 as the exciting light in the quantum-dot layer 13. This makes it possible to improve lifetimes of the quantum dots 13A and the phosphor wheel 1 having those quantum dots 13A.

Additionally, in the present embodiment, the quantum-dot layer 13 is sealed by the binder layer 14 and the gas barrier material 15, which makes it possible to reduce deterioration in the quantum dots 13A caused by oxygen or moisture.

Next, description is provided on a second embodiment and modification examples 1 to 11. Hereinafter, any components similar to those in the above-described first embodiment are denoted by same reference numerals, and descriptions thereof are omitted as appropriate.

2. Modification Examples

2-1. Modification Example 1

Figure 13:
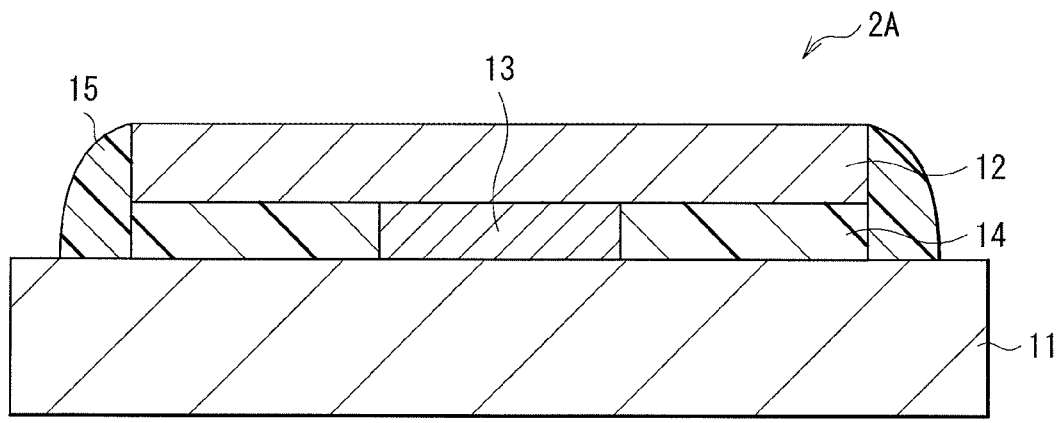
FIG. 13 is a cross-sectional schematic view of a configuration of a phosphor wheel according to a modification example 1 of the present disclosure.

FIG. 13 schematically illustrates a cross-sectional configuration of a phosphor wheel 2A according to a modification example 1 of the present disclosure. FIG. 13 corresponds to a cross section taken along the line I-I illustrated in FIG. 2. In the phosphor wheel 2A of the present modification example, an upper surface and a lower surface of the quantum-dot layer 13 are sealed by the substrate 11 and the phosphor layer 12, and side surfaces of the quantum-dot layer 13 are sealed by the binder layer 14 and the gas barrier material 15.

2-2. Modification Example 2

Figure 14:
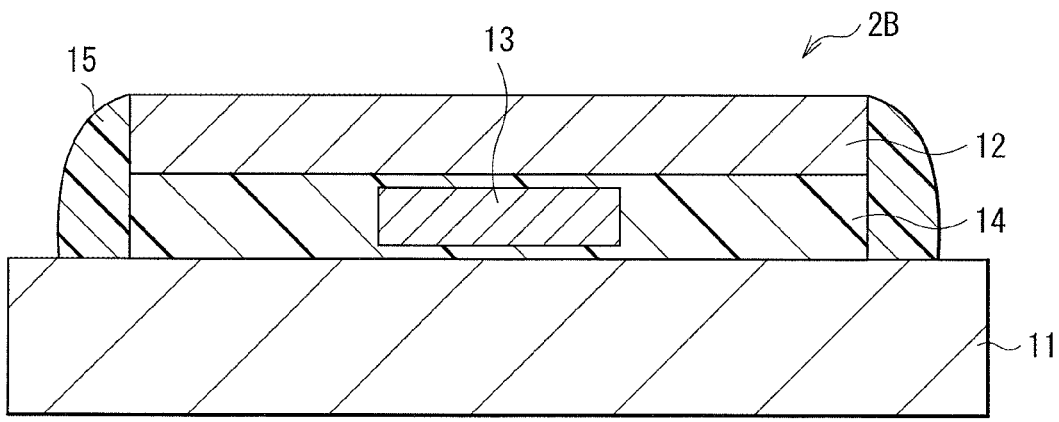
FIG. 14 is a cross-sectional schematic view of a configuration of a phosphor wheel according to a modification example 2 of the present disclosure.

FIG. 14 schematically illustrates a cross-sectional configuration of a phosphor wheel 2B according to a modification example 2 of the present disclosure. FIG. 14 corresponds to a cross section taken along the line I-I illustrated in FIG. 2. In the phosphor wheel 2B of the present modification example, the quantum-dot layer 13 is provided inside the binder layer 14.

The phosphor wheel 1 described in the above first embodiment may have a configuration as described above, other than a configuration in which the quantum-dot layer 13 is sealed on the phosphor layer 12 side by the binder layer 14. The phosphor wheels 2A and 2B in the modification examples 1 and 2 have effects similar to those in the above-described first embodiment.

2-3. Modification Example 3

Figure 15:
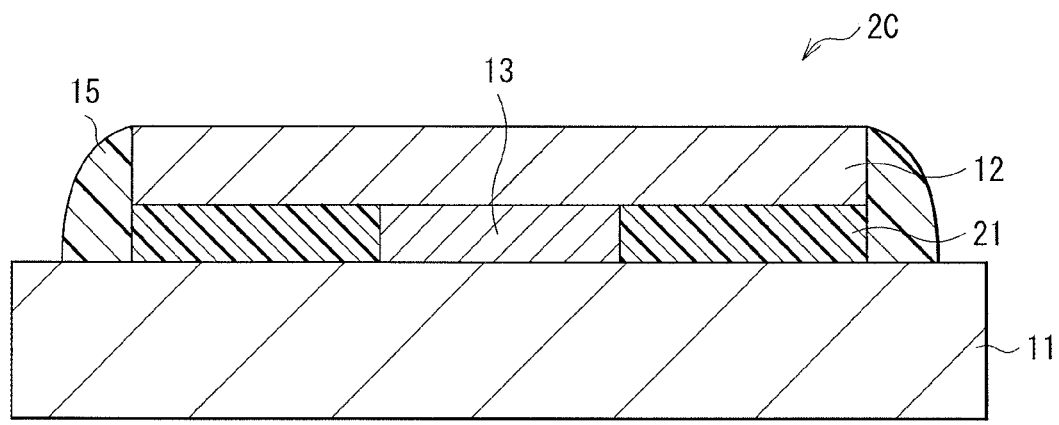
FIG. 15 is a cross-sectional schematic view of a configuration of a phosphor wheel according to a modification example 3 of the present disclosure.

FIG. 15 schematically illustrates a cross-sectional configuration of a phosphor wheel 2C according to a modification example 3 of the present disclosure. FIG. 15 corresponds to a cross section taken along the line I-I illustrated in FIG. 2. In the phosphor wheel 2C of the present modification example, a spacer 21 is disposed around the quantum-dot layer 13. In the phosphor wheel 2C, the substrate 11 and the phosphor layer 12 are joined with the spacer 21 interposed in between.

As described above, in the present modification example, the spacer 21 is disposed between the substrate 11 and the phosphor layer 12, which uniformizes a film thickness of the quantum-dot layer 13. This makes it possible to uniformize an amount of light outputted from the quantum-dot layer 13 under a trajectory in which the phosphor wheel 2C is irradiated with exciting light and to reduce output change or color change in a light source depending on a rotational cycle. It is to be noted that the spacer 21 preferably has gas barrier property, and includes, for example, a single-layer film of $SiO_2$, SiN, $AL_2O_3$, and ALO, a composite film in which two or more kinds of the above-described materials are combined, or the like.

2-4. Modification Example 4

Figure 16:
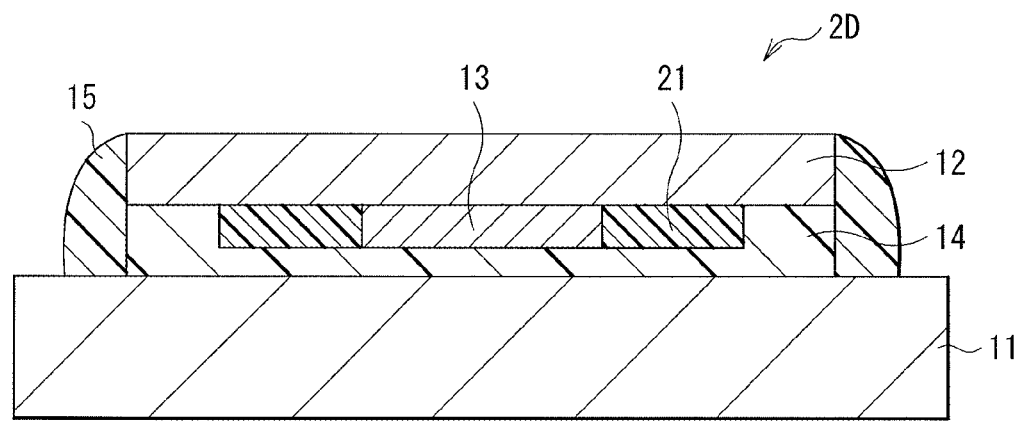
FIG. 16 is a cross-sectional schematic view of a configuration of a phosphor wheel according to a modification example 4 of the present disclosure.

FIG. 16 schematically illustrates a cross-sectional configuration of a phosphor wheel 2D according to a modification example 4 of the present disclosure. FIG. 16 corresponds to a cross section taken along the line I-I illustrated in FIG. 2. The phosphor wheel 2D of the present modification example corresponds to a combination of the first embodiment and the modification example 3, in which the spacer 21 is disposed around the quantum-dot layer 13, and side surfaces and a lower surface of the quantum-dot layer 13 are sealed by the binder layer 14. Further, on side surfaces of the binder layer 14, the gas barrier material 15 may be provided as appropriate that extends from the top surface of the substrate 11 to side surfaces of the phosphor layer 12.

As described above, in the present modification example, while a film thickness of the quantum-dot layer 13 is uniformized using the spacer 21, a periphery of the quantum-dot layer 13 is sealed by the binder layer 14 and the gas barrier material 15, which makes it possible to achieve light source emission with uniform chromaticity and long-term color change stability.

2-5. Modification Example 5

Figure 17:
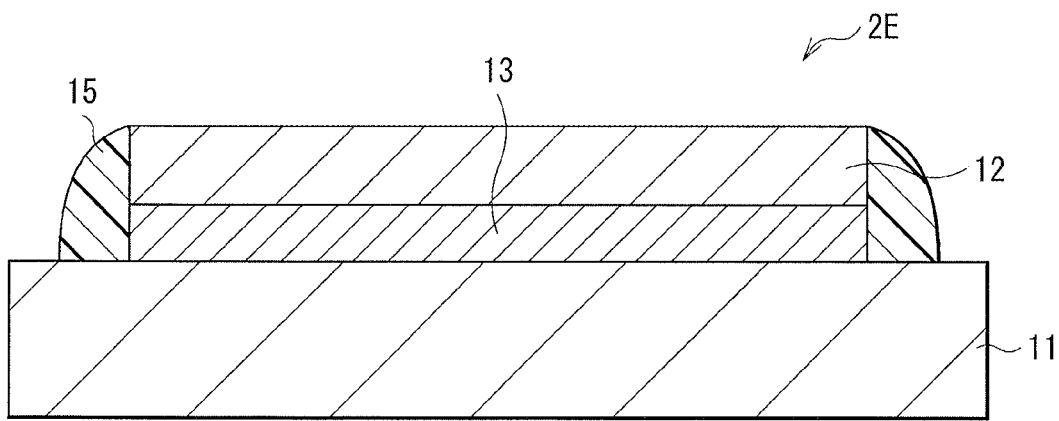
FIG. 17 is a cross-sectional schematic view of a configuration of a phosphor wheel according to a modification example 5 of the present disclosure.

FIG. 17 schematically illustrates a cross-sectional configuration of a phosphor wheel 2E according to a modification example 5 of the present disclosure. FIG. 17 corresponds to a cross section taken along the line I-I illustrated in FIG. 2. In the phosphor wheel 2E of the present modification example, the quantum-dot layer 13 a space formed by the substrate 11, the phosphor layer 12, and the gas barrier material 15 is filled with quantum dots 13A to form the quantum-dot layer 13. As described above, the binder layer 14 or the spacer 21 are not necessarily provided around the quantum-dot layer 13.

2-6. Modification Example 6

Figure 18A:
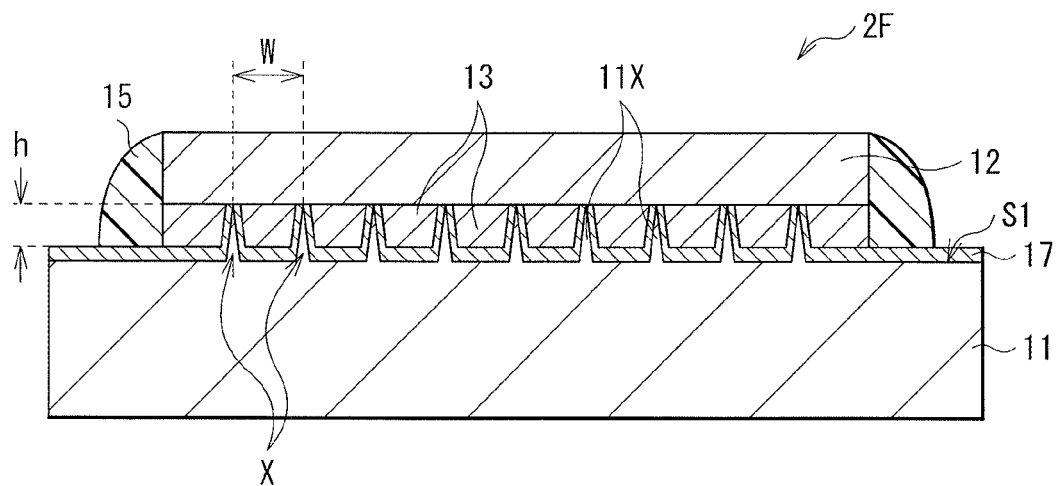
FIG. 18A is a cross-sectional schematic view of a configuration of a phosphor wheel according to a modification example 6 of the present disclosure.
Figure 18B:
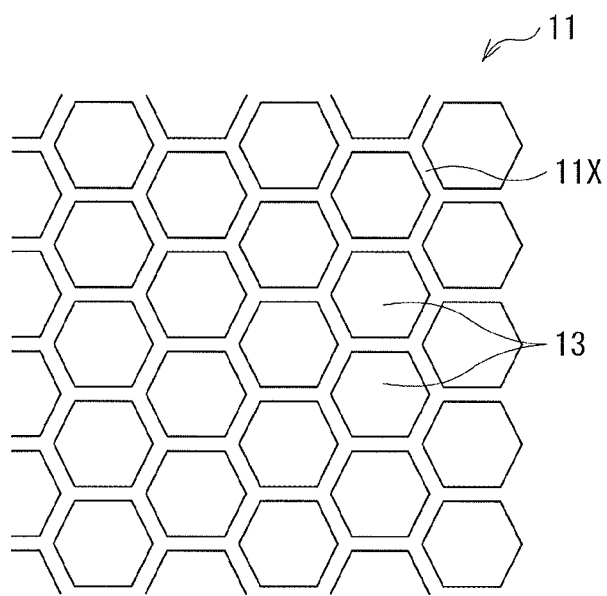
FIG. 18B is a schematic view of a planar structure of a substrate that is included in the phosphor wheel illustrated in FIG. 18A.

FIG. 18A schematically illustrates a cross-sectional configuration of a phosphor wheel 2F according to a modification example 6 of the present disclosure. FIG. 18A corresponds to a cross section taken along the line I-I illustrated in FIG. 2. FIG. 18B schematically illustrates a portion of a planar structure of the substrate 11 included in the phosphor wheel 2F. The phosphor wheel 2E of the present modification example has a configuration in which a reflecting structure X (a microreflector structure) is formed on the front surface (the surface S1) of the substrate 11.

The reflecting structure X includes a dam section 11X that is provided on the surface S1 of the substrate 11. The dam section 11X has, for example, a tapered shape, and is formed to partition the quantum-dot layer 13 that is provided between the substrate 11 and the phosphor layer 12 into a plurality of spaces, for example. On the front surface that includes the dam section 11X of the substrate 11, for example, the reflecting layer 17 is preferably formed. As with the above-described first embodiment, the reflecting layer 17 includes, for example, a metallic film containing a metal element such as aluminum (Al), silver (Ag), or titanium (Ti), or the like in addition to a dielectric multi-layer film. As an alternative, on the front surface including the dam section 11X of the substrate 11, a light scattering layer may be provided in place of the reflecting layer 17. The light scattering layer includes, for example, a titanium oxide ($TiO_2$) film or a barium sulfate ($BaSO_4$) film. Further, the dam section 11X itself may be formed using a light scattering material such as $TiO_2$ or $BaSO_4$ described above.

The dam section 11X is preferably formed to form the plurality of spaces partitioned by the dam sections 11X, for example, in a honeycomb shape as illustrated in FIG. 18B. This minimizes a percentage of the dam sections 11X in a plane of the quantum-dot layer 13, which makes it possible to extract the fluorescent light FL2 converted in the quantum-dot layer 13 at high efficiency. An interval (w) between the adjacent dam sections 11X is preferably, for example, 400 µm, or less, and a height (f) of the dam section 11X is preferably, for example, 200 µm or less.

As described above, in the present modification example, the reflecting structure X that partitions the quantum-dot layer 13 provided between the substrate 11 and the phosphor layer 12 into the plurality of spaces is provided on the front surface (the surface S1) of the substrate 11. For example, this makes it possible to suppress diffusion of light (the fluorescent light FL2) emitted in the quantum dot 13A within one space (a cell) partitioned by the reflecting structure X into other adjacent spaces. In other words, it is possible to suppress diffusion of light (the fluorescent light FL2) emitted in the quantum dot 13A into the quantum-dot layer 13. This makes it possible for light emitted in the quantum-dot layer 13 to become light with a low etendue as a light source, which allows for improvement in light extraction efficiency on the entrance side of the fluorescent light FL2, for example. It is to be noted that such light extraction efficiency is improved for not only the fluorescent light FL2, but also the fluorescent light FL1 and the exciting light EL. This allows brightness of a projected image of the projector 10 to be enhanced.

2-7. Modification Example 7

Figure 19:
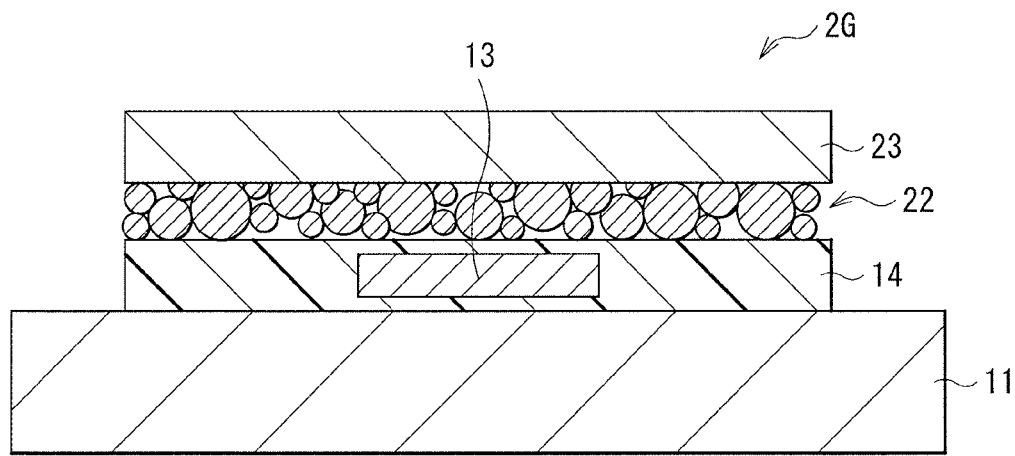
FIG. 19 is a cross-sectional schematic view of a configuration of a phosphor wheel according to a modification example 7 of the present disclosure.

FIG. 19 schematically illustrates a cross-sectional configuration of a phosphor wheel 2G according to a modification example 7 of the present disclosure. FIG. 19 corresponds to a cross section taken along the line I-I illustrated in FIG. 2. In the phosphor wheel 2G of the present modification example, a phosphor layer 22 is formed using a particulate phosphor. The phosphor layer 22 in the present modification example is formed in such a manner that, for example, the binder layer 14 that includes the quantum-dot layer 13 inside thereof is provided, and phosphor particles are filled between the binder layer 14 and a counter substrate 23.

The counter substrate 23 includes a material having light transmission property, and has property of transmitting the exciting light EL1, as well as the fluorescent light FL1 and the fluorescent light FL2 that are converted by the phosphor particles and the quantum dots 13A. Examples of a constituent material for the counter substrate 23 include quartz, glass, sapphire, crystal, and the like. Among these materials, it is preferable to use sapphire having the high thermal conductivity. As an alternative, in a case where a low-output light source is used in the light source unit 100 to be described later, a resin material such as polyethylene terephthalate (PET) or a silicone resin is usable.

It is to be noted that, although not illustrated in FIG. 19, it is preferable that, for example, the gas barrier material 15 be provided from the top surface of the substrate 11 to an end surface of a substrate 31 to seal a periphery of the phosphor layer 12.

2-8. Modification Example 8

Figure 20:
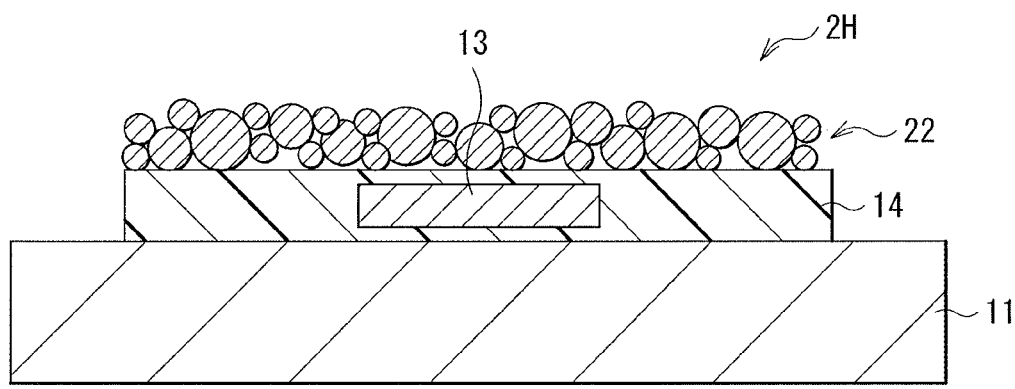
FIG. 20 is a cross-sectional schematic view of a configuration of a phosphor wheel according to a modification example 8 of the present disclosure.

FIG. 20 schematically illustrates a cross-sectional configuration of a phosphor wheel 2H according to a modification example 8 of the present disclosure. FIG. 20 corresponds to a cross section taken along the line I-I illustrated in FIG. 2. In the phosphor wheel 2H of the present modification example, the phosphor layer 22 is formed using a particulate phosphor, as with the modification example 7. The phosphor layer 22 in the present modification example includes a particle-accumulated layer that is formed by sintering phosphor particles, for example.

As described above, even if the phosphor layer 22 includes a phosphor other than the ceramics phosphor used in the above-described first embodiment, effects similar to those in the above-described first embodiment are achieved. As an alternative, other than the above-described configuration, the phosphor layer 22 may have a configuration in which a resin and a binder are used together with a plurality of phosphor particles. The binder binds a phosphor particle and another phosphor particle at adjacent positions, and binds a phosphor particle and, for example, a front surface of the binder layer 14. As the binder, an inorganic binder is preferable, and the binder includes, for example, a cross-linking value of an inorganic material such as liquid glass. The liquid glass is a silicate compound called sodium silicate, potassium silicate, or silicate soda, and a liquid in which $SiO_2$ (silicic anhydride) and $Na_2O$ (sodium oxide) or $K_2O$ (potassium oxide) are mixed at a predetermined ratio. A molecular formula of the liquid is expressed as $Na_2O.nSiO_2$. In addition to this, a binder such as TEOS ($Si(OC_2H_5)_4$) or a silicon resin, and an epoxy resin may be used.

3. Second Embodiment

Figure 21:
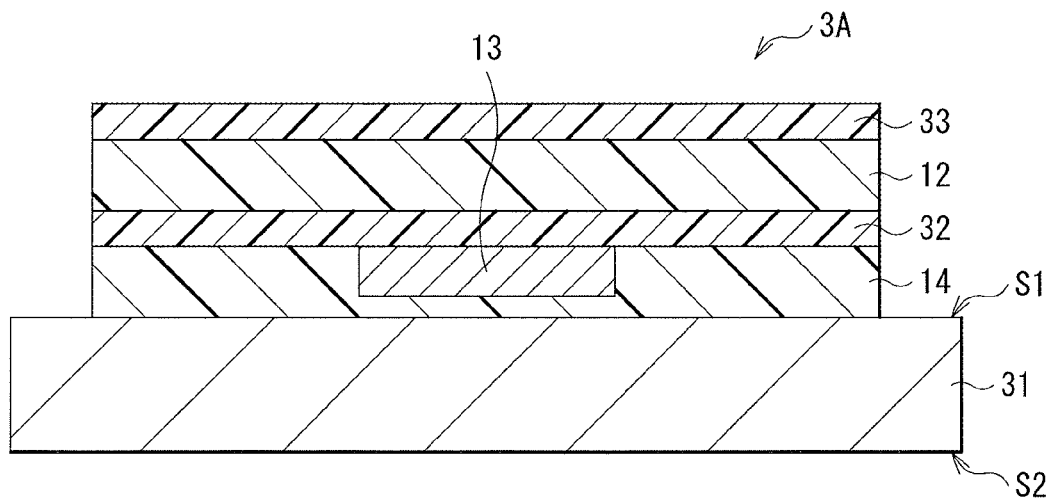
FIG. 21 is a cross-sectional schematic view of an example of a configuration of a phosphor wheel according to a second embodiment of the present disclosure.

FIG. 21 schematically illustrates a cross-sectional configuration of a wavelength conversion element (a phosphor wheel 3A) according to a second embodiment of the present disclosure. FIG. 21 corresponds to a cross section taken along the line I-I illustrated in FIG. 2. The phosphor wheel 3 of the present embodiment is a transmissive phosphor wheel, and a substrate 11 includes a material having light transmission property.

In the phosphor wheel 3 of the present embodiment, as with the above-described first embodiment, the quantum-dot layer 13 is disposed between a substrate 31 and the phosphor layer 12, and the exciting light EL1 emitted from the light source 110 first enters the phosphor layer 12. Further, the present embodiment has a configuration in which optical thin films 32 and 33 are respectively provided on the phosphor layer 12 and between the phosphor layer 12 and the quantum-dot layer 13.

As with the above-described counter substrate 23, the substrate 31 includes, for example, a material having light transmission property, and has property of transmitting the exciting light EL1 as well as the fluorescent light FL1 and the fluorescent light FL2 that are converted in the phosphor layer 12 and the quantum-dot layer 13 on the surface S2 side. Examples of a constituent material for the counter substrate 31 include quartz, glass, sapphire, crystal, and the like. Among these materials, it is preferable to use sapphire having the high thermal conductivity. As an alternative, in a case where a low-output light source is used in the light source unit 100 to be described later, a resin material such as polyethylene terephthalate (PET) or a silicone resin is usable.

The optical thin film 32 allows the exciting light EL1 to be transmitted therethrough, and reflects the fluorescent light FL1 converted in the phosphor layer 12. Providing the optical thin film 32 on the phosphor layer 12 allows the fluorescent light FL1 converted in the phosphor layer 12 to be more efficiently extracted on the output side (the substrate 31 side).

The optical thin film 33 reflects the fluorescent light FL2 converted in the quantum-dot layer 13, and allows light that is shorter in wavelength than the fluorescent light FL2 (specifically, the exciting light EL1 and the fluorescent light FL1 converted in the phosphor layer 12) to be transmitted therethrough. Providing the optical thin film 33 between the phosphor layer 12 and the quantum-dot layer 13 allows the fluorescent light FL2 converted in the quantum-dot layer 13 to be more efficiently extracted on the output side (the substrate 31 side).

Figure 22:
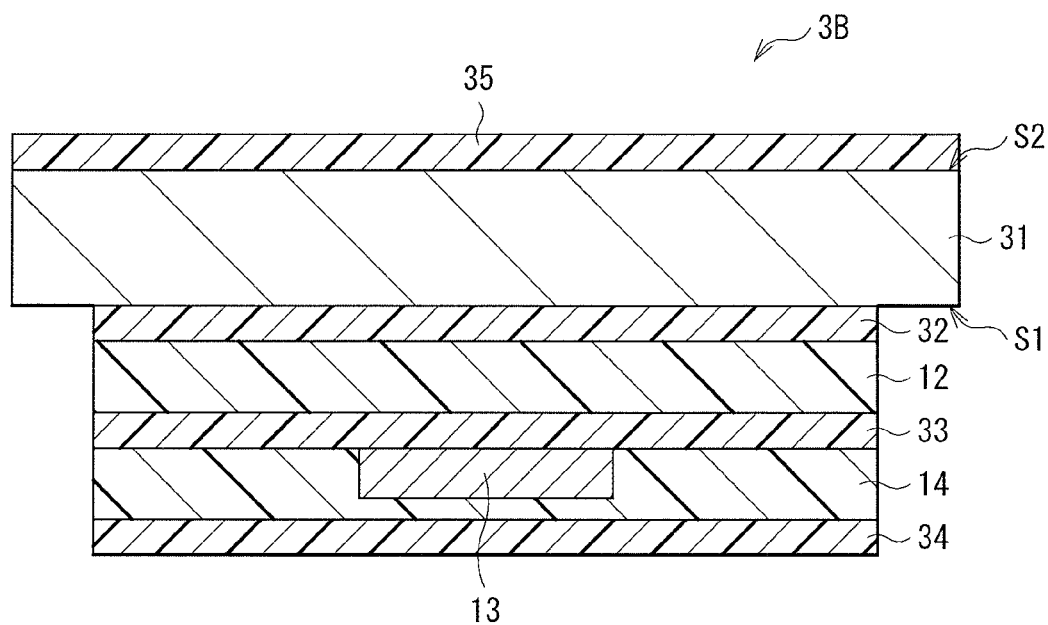
FIG. 22 is a cross-sectional schematic view of another example of the configuration of the phosphor wheel according to the second embodiment of the present disclosure.

Further, the phosphor wheel 3A of the present embodiment may be provided with any member other than the above-described members. FIG. 22 schematically illustrates a cross-sectional configuration of a phosphor wheel 3B as another example of the phosphor wheel 3A of the present embodiment.

In the phosphor wheel 3B, the phosphor layer 12 and the quantum-dot layer 13 are provided in this order on the surface S1 of the substrate 31. In the phosphor wheel 3B, the exciting light EL1 emitted from the light source section 110 is transmitted through the substrate 31 to first enter the phosphor layer 12. In the phosphor wheel 3B, the optical thin film 32 is provided between the substrate 31 and the phosphor layer 12, and the optical thin film 33 is provided between the phosphor layer 12 and the quantum-dot layer 13. Further, in the phosphor wheel 3B, an optical thin film 34 is provided on the quantum-dot layer 13 (specifically, on the binder layer 14 that seals the quantum-dot layer 13), and an optical thin film 35 is provided on the surface S2 side of the substrate 31.

The optical thin film 34 reduces reflection loss of the fluorescent light FL1 and the fluorescent light FL2 at an interface between the binder layer 14 and ambient air. It is to be noted that similar effects are also achieved by providing a microscopic uneven structure on a front surface of the binder layer 14 in place of the optical thin film 34.

The optical thin film 35 reduce reflection loss of the exciting light EL1 at an interface between ambient air and the substrate 31, and specifically, it is preferable to provide an antireflection film.

As described above, in any of the phosphor wheels 3A and 3B of the present embodiment, a so-called transmissive phosphor wheel is configured with use of the substrate 31 having light transmission property. The configuration as described above makes it possible to achieve effects similar to those of the reflective phosphor wheel 1 described in the first embodiment.

4. Modification Examples

4-1. Modification Example 9

Figure 23:
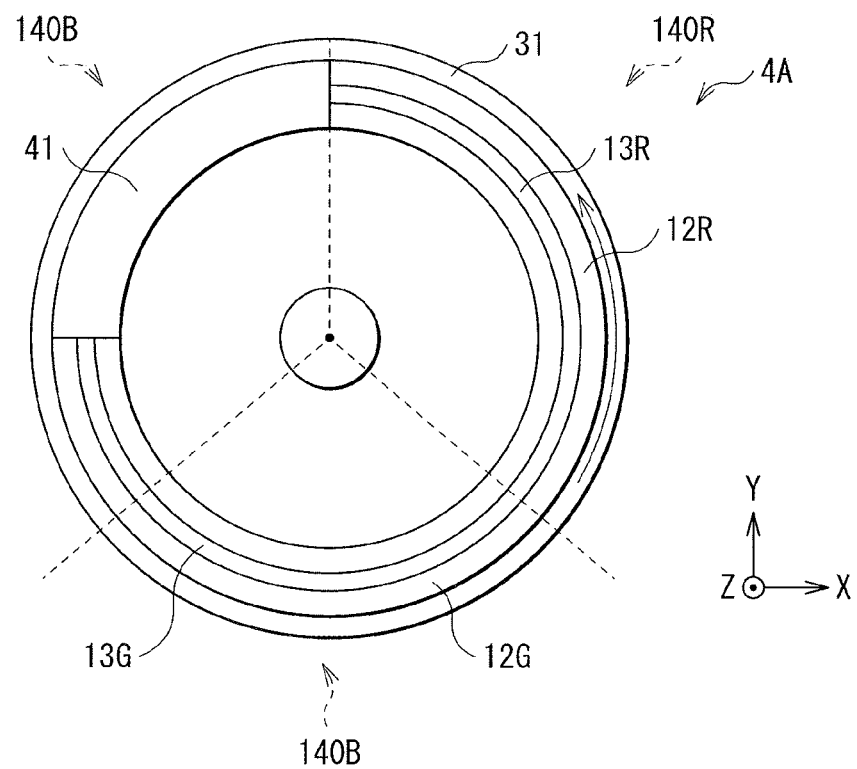
FIG. 23 is a planar schematic view of an example of an entire configuration of a phosphor wheel according to a modification example 9 of the present disclosure.

FIG. 23 schematically illustrates a planar configuration of a phosphor wheel 4A according to a modification example 9 of the present disclosure. The phosphor wheel 4A of the present modification example is a time-division phosphor wheel, and has a configuration in which three regions (a red conversion region 140R, a green conversion region 140G, and a blue conversion region 140B) corresponding to R, G, and B are provided on the substrate 31 having light transmission property.

Figure 24:
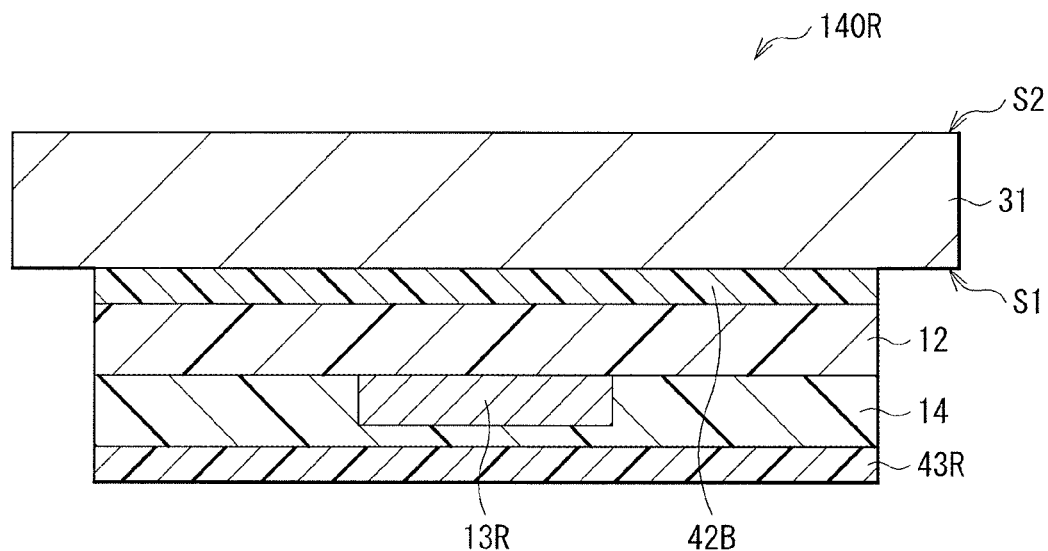
FIG. 24 is a cross-sectional schematic view of an example of a configuration of the phosphor wheel illustrated in FIG. 23.

For example, as illustrated in FIG. 24, the red conversion region 140R has a configuration in which a blue dichroic filter 42B, the phosphor layer 12, a red quantum-dot layer 13R, the binder layer 14, and a red filter 43R are stacked in this order on the surface S1 of the substrate 31. The blue dichroic filter 42B allows only blue light (the exciting light EL1) to be transmitted therethrough, and reflects light of any other wavelengths. The red quantum-dot layer 13R is excited by the fluorescent light FL1 converted by the phosphor layer 12 to output red fluorescent light (FL2R). The red filter 43R allows only red light (FL2R) to be transmitted therethrough, and reflects light of any other wavelengths. Accordingly, the red light FL2R is extracted along with the fluorescent light FL1 from the red conversion region 140R.

As with the red conversion region 140R, the green conversion region 140G has a configuration in which the blue dichroic filter 42B, the phosphor layer 12, a green quantum-dot layer 13G, the binder layer 14, and a green filter 43G are stacked in this order on the surface S1 of the substrate 31. The green quantum-dot layer 13G is excited by the fluorescent light FL1 converted by the phosphor layer 12 to output green fluorescent light (FL2G). The green filter 43G allows only green light (FL2G) to be transmitted therethrough, and reflects light of any other wavelengths. Accordingly, the green light FL2G is extracted from the green conversion region 140G. It is to be noted that, in the green conversion region 140G, the green quantum-dot layer 13G may be omitted. A green light component to be extracted from the green conversion region 140G is enhanced by providing the green quantum-dot layer 13G.

In the blue conversion region 140B, for example, a diffusion layer 41 is formed. The diffusion layer 41 diffuses the exciting light EL1 to make diffusion of blue light to be extracted from the blue conversion region 140B as uniform as diffusion of red light and green light that are extracted from other regions. In addition, the blue conversion region 140B may be provided with a blue quantum-dot layer, and the binder layer 14 that seals the blue quantum-dot layer. Providing the blue quantum-dot layer allows for reduction in generation of speckle by changing a wavelength of the exciting light EL1 that is blue light.

Figure 25:
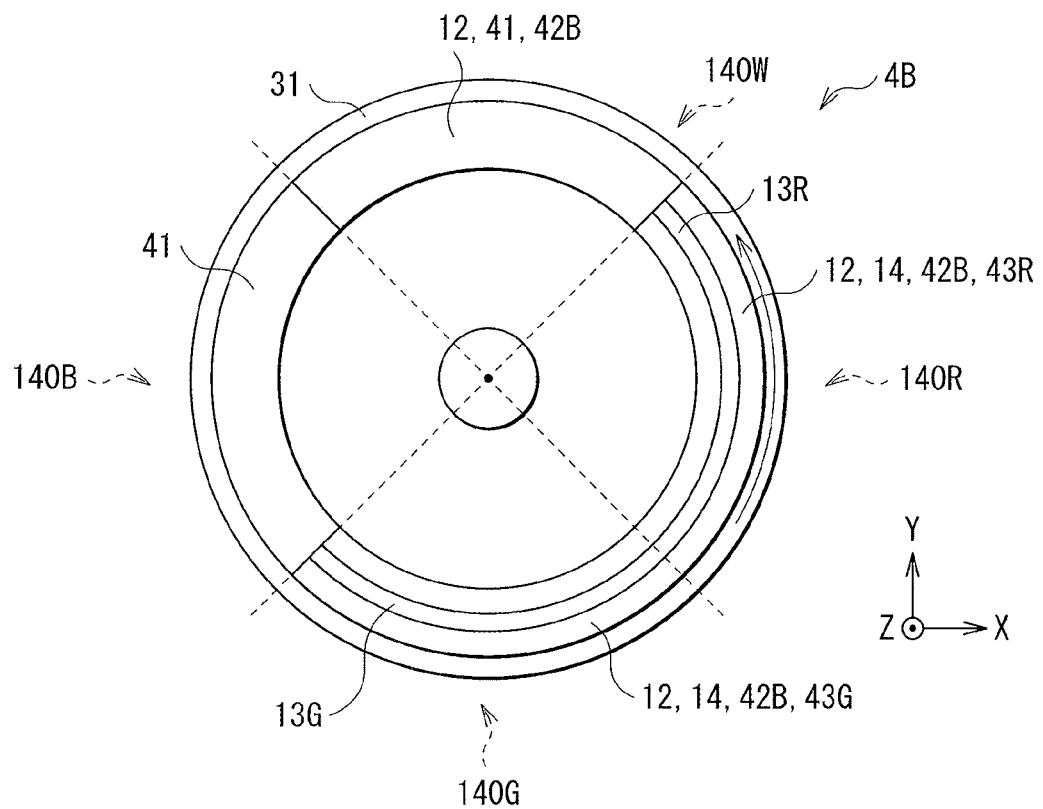
FIG. 25 is a planar schematic view of another example of the entire configuration of the phosphor wheel according to the modification example 9 of the present disclosure.

Further, the phosphor wheel 4A of the present modification example may have a configuration as illustrated in an example in FIG. 25. A phosphor wheel 4B illustrated in FIG. 25 is provided with a region corresponding to white (W; a white conversion region 140W) in addition to R, G, and B. In the white conversion region 140W, for example, the blue dichroic filter 42B, the phosphor layer 12, and the diffusion layer 41 are stacked in this order on the surface S1 of the substrate 31. Providing the white conversion region 140W in addition to the red conversion region 140R, the green conversion region 140G, and the blue conversion region 140B allows for improvement in luminance.

It is to be noted that layers having an optical function are only illustrated in FIG. 23, FIG. 24, and FIG. 25; however, the phosphor wheels 4A and 4B may be provided with any member other than these layers. For example, to improve the flatness and heat dissipation performance of the substrate 31, for example, a sapphire layer or a glass layer may be provided.

Further, the phosphor wheels 3A and 3B of the above-described second embodiment, and the phosphor wheels 4A and 4B of the modification example 9 may have any of configurations in the above-described modification examples 1 to 6, as with the phosphor wheel 1.

4-2. Modification Example 10

Figure 26:
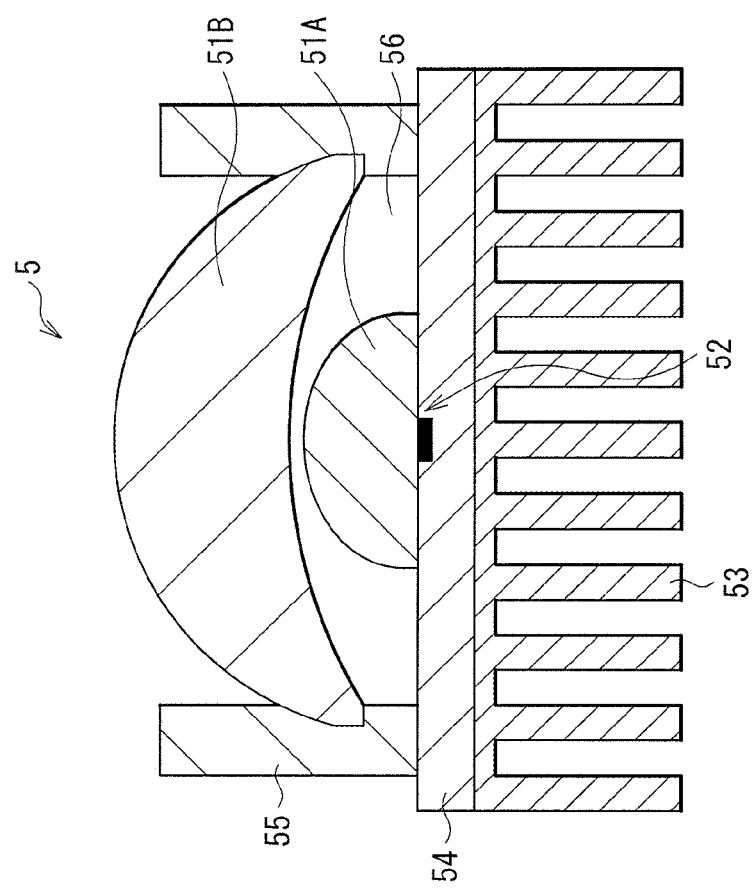
FIG. 26 is a cross-sectional schematic view of a configuration of a fixed wavelength conversion section according to a modification example 10 of the present disclosure.

FIG. 26 schematically illustrates a cross-sectional configuration of a wavelength conversion element (a fixed wavelength conversion section 5) according to a modification example 10 of the present disclosure. The fixed wavelength conversion section 5 includes collecting lenses 51A and 51B, a wavelength conversion layer 52, a heatsink 53, a heat spreader 54, and a lens holder 55.

In the fixed wavelength conversion section 5, the collecting lens 51B and the collecting lens 51A are disposed in order of entrance of exciting light. The collecting lens 51A has a predetermined lens face onto which the wavelength conversion layer 52 is joined. The collecting lens 51A collects the exciting light incoming through the collecting lens 51B on the wavelength conversion layer 52. Further, the collecting lens 51A outputs a fluorescent light component from the wavelength conversion layer 52 toward the collecting lens 51B.

The collecting lens 51B collects the exciting light from a light source section 20 toward the collecting lens 51A. Further, the collecting lens 51B collects a fluorescent light component incoming from the wavelength conversion layer 52 through the collecting lens 51A toward the light source section 20. For example, the collecting lens 51B is greater than the collecting lens 51A in outer diameter, and an outer circumferential portion thereof is held by the lens holder 55.

The wavelength conversion layer 52 includes, for example, a phosphor layer and a quantum-dot layer that are stacked, and the phosphor layer is provided on the entrance side of exciting light, as with the above-described first embodiment. All the wavelength conversion layer 52 and a region, other than a region onto which the wavelength conversion layer 52 is joined, of the predetermined lens face of the collecting lens 51A are preferably attached to a heat dissipation member with a thermal conduction layer interposed in between.

The heatsink 53 and the heat spreader 54 each have a function as a heat dissipation member that diffuses heat generation of the wavelength conversion layer 52 to lower temperature. Further, the heat spreader 54 has a function of lowering temperature of the collecting lens 51A. The heatsink 53 is provided on a rear surface of the heat spreader 54. The heatsink 53 has a function of conducting heat diffused by the heat spreader 54 to air to dissipate heat. The heatsink 53 and the heat spreader 54 each include a material having relatively higher thermal conductivity, such as metal or ceramics. For example, the heatsink 53 and the heat spreader 54 each include copper, aluminum, sapphire, molybdenum, or the like.

The lens holder 55 performs positioning of the collecting lens 51B and hold the collecting lens 51. The lens holder 55 may be integrated with the heat spreader 54.

4-3. Modification Example 11

Figure 27:
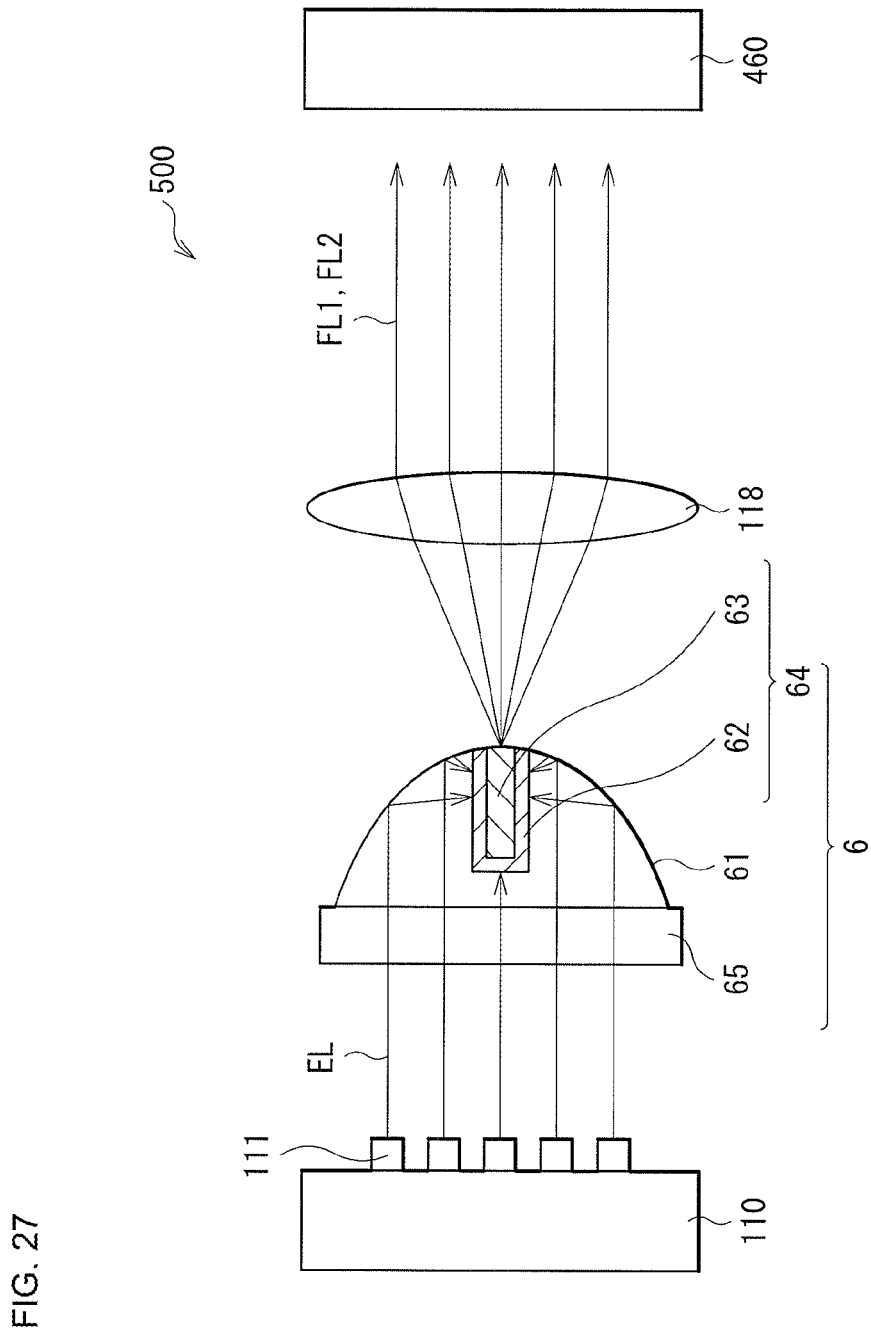
FIG. 27 is a simplified diagram illustrating a configuration of a light source unit having a fixed wavelength conversion section according to a modification example 11 of the present disclosure.

FIG. 27 illustrates a schematic configuration of a light source unit 500 that includes a wavelength conversion element (a fixed wavelength conversion section 6) according to a modification example 11 of the present disclosure. The fixed wavelength conversion section 6 includes a concave mirror 61, a wavelength conversion section 64, and a diffuser plate 65, and has a structure of collecting the exciting light EL emitted from a laser group 111 of the light source section 110 on the wavelength conversion section 64 with use of the concave mirror 61. The wavelength conversion section 64 includes, for example, a quantum-dot layer 63 that is formed in a rod shape, and a phosphor layer 62 that is provided on a front surface of the quantum-dot layer 63. In the fixed wavelength conversion section 6, the exciting light EL emitted from the light source section 110 is diffused into the concave mirror 61 by the diffuser plate 65. The diffused exciting light EL is reflected by the concave mirror 61 to be collected on the wavelength conversion section 64. The wavelength conversion section 64 converts most of the exciting light EL into the fluorescent light FL1. The quantum-dot layer 13 is irradiated with the converted fluorescent light FL1, a portion of which is converted into, for example, red fluorescent light FL2 to be outputted toward a lens 118 along with the fluorescent light FL1.

As described above, the wavelength conversion element included in the light source unit of the present disclosure is applicable to not only any of rotary wavelength conversion elements (the phosphor wheels 1, 2A to 2H, 3A, 3B, 4A, and 4B) that are described in the above-described first and second embodiments, and the above-described modification examples 1 to 8, but also any of the fixed wavelength conversion elements as described in the above-described modification examples 10 and 11.

4-4. Modification Example 12

Figure 28:
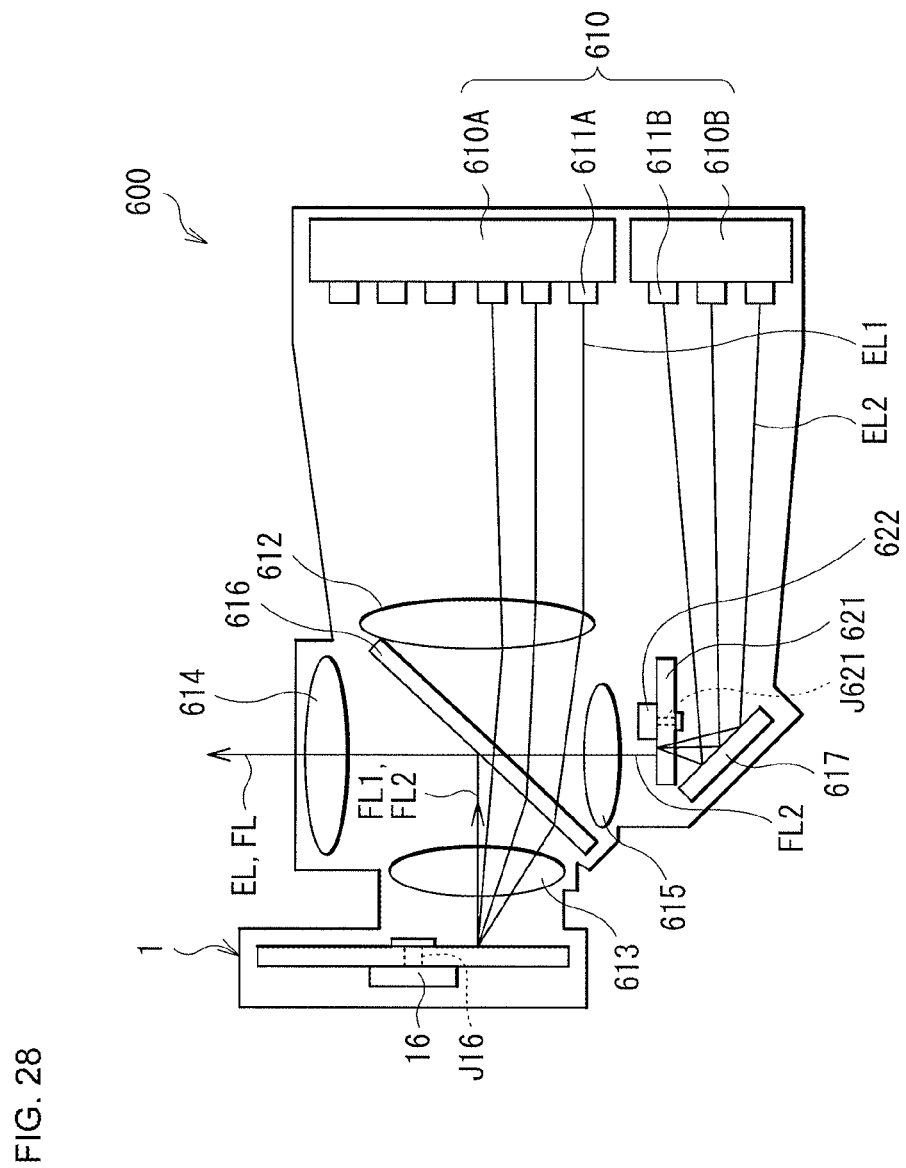
FIG. 28 is a simplified diagram illustrating a configuration example of a light source unit according to a modification example 12 of the present disclosure.

FIG. 28 is a simplified diagram illustrating an entire configuration of a light source unit 600 according to a modification example 12 of the present disclosure. The light source unit 600 is used as, for example, a light source unit of the projector 10 illustrated in FIG. 9.

The light source unit 600 includes the above-described phosphor wheel 1, a diffuser plate 621, a light source section 610 that emits exciting light or laser light, lenses 612 to 615, a dichroic mirror 616, and a reflecting mirror 617. The phosphor wheel 1 is, for example, a reflective wavelength conversion element, and is rotatably supported by an axis J16. The diffuser plate 621 is rotatably supported by an axis J621. The light source section 610 has a first laser group 610A and a second laser group 610B. The first laser group 610A includes a plurality of semiconductor laser elements 611A that are arranged, and the second laser group 610B includes a plurality of semiconductor laser elements 611B that are arranged. The semiconductor laser elements 611A each oscillate exciting light (for example, a wavelength of 445 nm or 455 nm), and the semiconductor layer elements 611B each oscillate blue laser light (for example, a wavelength of 465 nm). Here, for the sake of convenience, the exciting light to be oscillated from the first laser group 610A is denoted by EL1, and the blue laser light (hereinafter referred to as blue light simply) to be oscillated from the second laser group 610B is denoted by EL2.

In the present modification example, the phosphor wheel 1 is disposed to cause the exciting light EL1 that having been transmitted through the lens 612, the dichroic mirror 616, and the lens 613 in this order from the first laser group 610A to enter the phosphor layer 12 and the quantum-dot layer 13 in this order. The fluorescent light FL1 from the phosphor wheel 1 is reflected by the dichroic mirror 616, and thereafter is transmitted through the lens 614 to be headed to outside, that is, the illumination optical system 200. The diffuser plate 621 diffuses the blue light EL2 that has been transmitted through the reflecting mirror 617 from the second laser group 610B. The blue light EL2 diffused by the diffuser plate 621 is transmitted through the lens 615 and the dichroic mirror 616, and thereafter is transmitted through the lens 614 to be headed to outside, that is, the illumination optical system 200. It is to be noted that a cooling fan may be provided inside the light source unit 600 to reduce heat generation of the phosphor layer 12 and the quantum-dot layer 13 in association with irradiation with the exciting light EL1.

Next, operation of the projector 10 including the light source unit 600 is described with reference to FIG. 9 and FIG. 28.

First, in the light source unit 600, motors 16 and 622 are driven to rotate the phosphor wheel 1 and the diffuser plate 621. Subsequently, the exciting light EL1 and the blue light EL2 are oscillated respectively from the first laser group 610A and the second laser group 610B in the light source section 610.

The exciting light EL1 is oscillated from the first laser group 610A, and is transmitted through the lens 612, the dichroic mirror 616, and the lens 613 in this order, and thereafter is applied to the phosphor layer 12 of the phosphor wheel 1. The phosphor layer 12 absorbs a portion of the exciting light EL1 to convert the portion of the exciting light EL1 into the fluorescent light FL1 that is yellow light, and outputs the yellow light toward the lens 613. The quantum-dot layer 13 absorbs a portion of the fluorescent light FL1 converted in the phosphor layer 12 to convert the portion of the fluorescent light FL1 into, for example, the fluorescent light FL2 that is red light, and outputs the red light toward the lens 613. The fluorescent light FL1 and the fluorescent light FL2 are reflected by the dichroic mirror 616, and thereafter is transmitted through the lens 614 to be headed to the illumination optical system 200.

The blue light EL2 is oscillated from the second laser group 610B to be transmitted through the reflecting mirror 617, and thereafter is applied to the diffuser plate 621. The diffuser plate 621 diffuses the blue light EL2 to output the blue light EL2 toward the lens 615. The blue light EL2 is transmitted through the dichroic mirror 616, and thereafter is transmitted through the lens 614 to be headed to the illumination optical system 200.

In such a manner, the light source unit 600 causes white light and the blue light (EL2) to enter the illumination optical system 200. The white light is formed by synthesizing the fluorescent light FL (the fluorescent light FL1 and the fluorescent light FL2) that are respectively yellow light and red light.

Although the present technology has been described with reference to the first and second embodiments and the modification examples 1 to 12 thereof, the present technology is not limited to the above-described embodiments and the like, and may be modified in a variety of ways. For example, the material, the thickness, and the like of each of the layers described in the above-described embodiments are illustrative and non-limiting, and any other material and any other thickness may be adopted.

Further, as the projection display according to the present technology, any apparatus other than the above-described projector may be configured. For example, in the above-described first embodiment, description is provided in the example of the reflective 3LCD projector that uses the reflective liquid crystal panel as the light modulation element; however, the present technology is not limited thereto.

The present technology is also applicable to a so-called transmissive 3LCD projector used with a transmissive liquid crystal panel.

Additionally, the light source unit according to the present technology may be used for an apparatus other than a projection display. For example, the light source unit 100 of the present disclosure may be used for illumination, and is applicable to a light source for a headlight of an automobile or a light source for illumination, for example It is to be noted that the present technology may be configured as follows.

(1)

A light source unit comprising:

a light source section; and a wavelength conversion element that is excited by exciting light from the light source section to emit fluorescent light, the wavelength conversion element including a substrate that is rotatable around a rotation axis, a phosphor layer including a plurality of phosphor particles, and a quantum-dot layer including a plurality of quantum dots, and the phosphor layer and the quantum-dot layer being disposed in this order relative to the light source section.

(2)

The light source unit according to (1), in which the wavelength conversion element has a first optical film on an entrance side of the exciting light of the phosphor layer.

(3)

The light source unit according to (2), in which the first optical film comprises an antireflection film, or a dichroic film that reflects a fixed percentage of the exciting light.

(4)

The light source unit according to any one of (1) to (3), in which the wavelength conversion element has a second optical film between the phosphor layer and the quantum-dot layer.

(5)

The light source unit according to (4), in which the second optical film includes a dichroic film that reflects the exciting light.

(6)

The light source unit according to any one of (1) to (5), in which the wavelength conversion element has a third optical film between the substrate and the quantum-dot layer.

(7)

The light source unit according to (6), in which the third optical film includes a dielectric multi-layer film or a metallic film having light reflection property.

(8)

The light source unit according to any one of (1) to (7), in which the quantum-dot layer is fixed on the phosphor layer with a binder having light transmission property, and the phosphor layer is joined to the substrate with the binder interposed in between.

(9)

The light source unit according to any one of (1) to (8), in which the quantum-dot layer has an upper surface and a lower surface that are covered by a binder having light transmission property.

(10)

The light source unit according to any one of (1) to (9), in which a spacer is disposed around the quantum-dot layer, and the substrate and the phosphor layer are joined with the spacer interposed in between.

(11)

The light source unit according to any one of (1) to (10), in which an end surface of the quantum-dot layer is sealed by a gas barrier material.

(12)

The light source unit according to any one of (1) to (11), in which the phosphor layer includes a ceramics phosphor.

(13)

The light source unit according to any one of (1) to (11), in which the phosphor layer includes the plurality of phosphor particles that is filled in a space between a substrate having light transmission property and the quantum-dot layer.

(14)

The light source unit according to any one of (1) to (11), in which the phosphor layer includes the plurality of phosphor particles that is bound to one another by a binder.

(15)

The light source unit according to any one of (1) to (14), in which the phosphor layer is formed continuously in a rotational circumferential direction of the substrate.

(16)

The light source unit according to any one of (1) to (15), in which the substrate has light reflection property or light transmission property.

(17)

The light source unit according to any one of (1) to (16), in which the substrate has a plurality of regions that outputs wavelengths different from one another.

(18)

A projection display including:

a light source unit;

a light modulation element that modulates light outputted from the light source unit; and a projection optical system that projects light from the light modulation element, the light source unit including a light source section, and a wavelength conversion element that is excited by exciting light from the light source section to emit fluorescent light, the wavelength conversion element including a substrate that is rotatable around a rotation axis, a phosphor layer including a plurality of phosphor particles, and a quantum-dot layer including a plurality of quantum dots, and the phosphor layer and the quantum-dot layer being disposed in this order relative to the light source section.

This application claims the benefit of Japanese priority Patent Application JP2017-157570 filed with the Japan Patent Office on Aug. 17, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A light source unit comprising:

a light source section; and a wavelength conversion element that is excited by exciting light from the light source section to emit fluorescent light, the wavelength conversion element including:

a substrate that is rotatable around a rotation axis, a phosphor layer including a plurality of phosphor particles, and a quantum-dot layer including a plurality of quantum dots, wherein the phosphor layer and the quantum-dot layer are disposed in this order relative to the light source section, wherein the phosphor layer and the quantum-dot layer are each formed continuously in a rotational circumferential direction of the substrate, wherein a diameter of the phosphor layer is greater than a diameter of the quantum-dot layer, and wherein the phosphor layer and the quantum-dot layer are each provided on a same side of the substrate.

2. The light source unit according to claim 1, wherein the wavelength conversion element has a first optical film on an entrance side of the exciting light of the phosphor layer.

3. The light source unit according to claim 2, wherein the first optical film comprises an antireflection film, or a dichroic film that reflects a fixed percentage of the exciting light.

4. The light source unit according to claim 1, wherein the wavelength conversion element has a second optical film between the phosphor layer and the quantum-dot layer.

5. The light source unit according to claim 4, wherein the second optical film comprises a dichroic film that reflects the exciting light.

6. The light source unit according to claim 1, wherein the wavelength conversion element has a third optical film between the substrate and the quantum-dot layer.

7. The light source unit according to claim 6, wherein the third optical film comprises a dielectric multi-layer film or a metallic film having light reflection property.

8. The light source unit according to claim 1, wherein the quantum-dot layer is fixed on the phosphor layer with a binder having light transmission property, and the phosphor layer is joined to the substrate with the binder interposed in between.

9. The light source unit according to claim 1, wherein the quantum-dot layer has an upper surface and a lower surface that are covered by a binder having light transmission property.

10. The light source unit according to claim 1, wherein a spacer is disposed around the quantum-dot layer, and the substrate and the phosphor layer are joined with the spacer interposed in between.

11. The light source unit according to claim 1, wherein an end surface of the quantum-dot layer is sealed by a gas barrier material.

12. The light source unit according to claim 1, wherein the phosphor layer includes a ceramics phosphor.

13. The light source unit according to claim 1, wherein the phosphor layer includes the plurality of phosphor particles that is filled in a space between a substrate having light transmission property and the quantum-dot layer.

14. The light source unit according to claim 1, wherein the phosphor layer includes the plurality of phosphor particles that is bound to one another by a binder.

15. The light source unit according to claim 1, wherein the substrate has light reflection property or light transmission property.

16. The light source unit according to claim 1, wherein the substrate has a plurality of regions that outputs wavelengths different from one another.

17. A projection display comprising:

a light source unit;

a light modulation element that modulates light outputted from the light source unit; and a projection optical system that projects light from the light modulation element, the light source unit including:

a light source section, and a wavelength conversion element that is excited by exciting light from the light source section to emit fluorescent light, the wavelength conversion element including:

a substrate that is rotatable around a rotation axis, a phosphor layer including a plurality of phosphor particles, and a quantum-dot layer including a plurality of quantum dots, wherein the phosphor layer and the quantum-dot layer are disposed in this order relative to the light source section, wherein the phosphor layer and the quantum-dot layer are each formed continuously in a rotational circumferential direction of the substrate, wherein a diameter of the phosphor layer is greater than a diameter of the quantum-dot layer, and wherein the phosphor layer and the quantum-dot layer are each provided on a same side of the substrate.

18. The projection display according to claim 17, wherein the wavelength conversion element has a first optical film on an entrance side of the exciting light of the phosphor layer.

19. The projection display according to claim 18, wherein the first optical film comprises an antireflection film, or a dichroic film that reflects a fixed percentage of the exciting light.

20. The projection display unit according to claim 17, wherein the wavelength conversion element has a second optical film between the phosphor layer and the quantum-dot layer.

* * * * *